US012783406B2

(12) United States Patent
Luo et al.

(10) Patent No.: US 12,783,406 B2
(45) Date of Patent: Nov. 3, 2026

(54) MEMORY SYSTEM, CONTROLLER, HOST AND OPERATION METHOD

(71) Applicant: YANGTZE MEMORY TECHNOLOGIES CO., LTD., Wuhan (CN)

(72) Inventors: Xianwu Luo, Wuhan (CN); Youxin He, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 28 days.

(21) Appl. No.: 18/935,169

(22) Filed: Nov. 1, 2024

(65) Prior Publication Data

US 2025/0238363 A1 Jul. 24, 2025

(30) Foreign Application Priority Data

Jan. 18, 2024 (CN) ........................ 202410075759.X

(51) Int. Cl.
*G06F 12/02* (2006.01)

(52) U.S. Cl.
CPC ................................ *G06F 12/0246* (2013.01)

(58) Field of Classification Search
None
See application file for complete search history.

(56) References Cited

U.S. PATENT DOCUMENTS

| | | | | |
|---|---|---|---|---|
| 10,866,861 | B1 * | 12/2020 | Palmer | G06F 3/0679 |
| 2015/0154066 | A1 * | 6/2015 | Grimsrud | G06F 11/108 714/764 |
| 2019/0196903 | A1 * | 6/2019 | Yeh | G06F 3/0679 |
| 2020/0110661 | A1 * | 4/2020 | Singidi | G06F 3/061 |
| 2024/0168849 | A1 * | 5/2024 | Luo | G06F 13/1673 |
| 2025/0165170 | A1 * | 5/2025 | Bao | G06F 11/10 |

* cited by examiner

*Primary Examiner* — Jared I Rutz
*Assistant Examiner* — Alexander J Yoon
(74) *Attorney, Agent, or Firm* — Conley Rose, P.C.

(57) ABSTRACT

The example of the present application discloses a memory system, a controller, a host and an operation method, which relates to the field of storage technology. In the memory system, a first interface is configured on the host, a second interface is configured on the controller. When the controller writes data to the memory, it swaps temporary parity data with the host through the second interface and the first interface. Compared with the swap of temporary parity data between the controller and the memory, on one hand, the memory overhead can be reduced, thereby improving the OP of the memory; on another hand, the IO bandwidth between the controller and the memory can be saved, thereby improving the performance of the controller and the memory.

20 Claims, 18 Drawing Sheets

MEMORY SYSTEM, CONTROLLER, HOST AND OPERATION METHOD

CROSS-REFERENCE TO RELATED APPLICATIONS

The present application claims priority to Chinese Patent Application No. 202410075759X, which was filed Jan. 18, 2024, and is hereby incorporated herein by reference in its entirety.

TECHNICAL FIELD

The example of present application relates to the field of memory technology, in particular to a memory system, a controller, a host and an operation method.

BACKGROUND

When writing data to a memory such as a 3D NAND (NAND gate), the controller also generates parity data for the data, so that when an error occurs in case of reading the data later, the data can be restored based on the parity data.

SUMMARY

The example of present application provides a memory system, a controller, a host and an operation method, which can improve the performance of the memory.

In the first aspect, a memory system is provided, the memory system comprises a host, a controller and a memory, the host comprises a first interface, the controller comprises a second interface, the memory comprises a plurality of memory planes, each memory plane of the plurality of memory planes comprises a plurality of word lines numbered according to the same rule, and each word line of the plurality of word lines is coupled to a plurality of memory strings;

The controller is configured to:

obtain target write data, wherein the target write data comprises write data corresponding to a plurality of selected word lines respectively, and the plurality of selected word lines comprise word lines with target word line numbers in the plurality of memory planes;

during the process of storing the target write data in the memory strings coupled to the plurality of selected word lines respectively, swap temporary parity data with the host through the second interface and the first interface to determine the target parity data for the target write data, and the temporary parity data is the parity data generated in the process of determining the target parity data.

in some examples, the host further comprises a first buffer, and the controller further comprises a second buffer, the first buffer is to store temporary parity data received by the host through the first interface, the second buffer is to store temporary parity data received by the controller through the second interface and temporary parity data currently generated, and the capacity of the first buffer is greater than the capacity of the second buffer.

In some examples, the plurality of selected word lines comprises N groups of selected word lines, each group of selected word lines comprises n selected word lines, where n is greater than or equal to 1, and N is greater than 1;

The controller is configured to: store write data corresponding to each group of selected word lines in the N groups of selected word lines sequentially; after the storing of the write data corresponding to the i-th group of selected word lines is complete, i is greater than or equal to 1, send the temporary parity data for the write data corresponding to the i-th group of selected word lines through the second interface;

The host is configured to: receive the temporary parity data for the write data corresponding to the i-th group of selected word lines through the first interface, and store the temporary parity data for the write data corresponding to the i-th group of selected word lines;

The controller is further configured to: determine the temporary parity data for the write data corresponding to the N-th group of selected word lines as the target parity data.

In some examples, N is greater than 1;

The controller is configured to: obtain temporary parity data for the write data corresponding to the i−1th group of selected word lines backed up on the host through the second interface, and determine the temporary parity data for the write data corresponding to the i-th group of selected word lines based on the obtained temporary parity data.

In some examples, the write data corresponding to each group of selected word lines comprises a plurality of page data numbered according to the same rule;

The controller is configured to: store each page data of the plurality of page data corresponding to the i-th group of selected word lines sequentially, and after the storing of the j-th page data corresponding to the i-th group of selected word lines is complete, where j is greater than or equal to 1, and send the temporary parity data for the j-th page data corresponding to the i-th group of selected word lines through the second interface;

The host is configured to: receive the temporary parity data for the j-th page data corresponding to the i-th group of selected word lines through the first interface, and store the temporary parity data for the j-th page data corresponding to the i-th group of selected word lines.

In some examples, i is greater than 1;

The controller is further configured to: obtain temporary parity data for the j-th page data corresponding to the i−1th group of selected word lines through the second interface, and determine the temporary parity data for the j-th page data in the i-th group of selected word lines based on the obtained temporary parity data.

In some examples, the memory comprises at least one memory die, and each memory die of the at least one memory die comprises the plurality of memory planes;

The host further comprises a first buffer, the first buffer comprises at least one first region, the at least one first region corresponds to a memory die respectively, and each first region comprises a plurality of first sub-regions, and the plurality of first sub-regions correspond to a page number respectively.

In some examples, the host is configured to:

when receiving temporary parity data for the j-th page data corresponding to the i-th group of selected word lines through the first interface, select a first sub-region from the first region corresponding to the target memory die based on the page number corresponding to the j-th page data, and the target memory die is the memory die to store the target write data;

store the received temporary parity data in the selected first sub-region in way of overwriting.

In some examples, the memory comprises at least one memory die, each of which comprises the plurality of memory planes;

The controller further comprises a second buffer, the second buffer comprises at least one second region, which corresponds to a memory die respectively, each second region comprises a plurality of second sub-regions, and the total number of second sub-regions in each second region is less than the total number of page data corresponding to a group of selected word lines.

In some examples, the controller is further configured to:

before storing the j-th page data corresponding to the i-th group of selected word lines, in case of no idle second sub-region existing in the second region corresponding to the target memory die, select a second sub-region with a state being the encoding complete state from the second region corresponding to the target memory die, and send temporary parity data in the selected second sub-region through the second interface, and the target memory die is the memory die to store the target write data;

obtain the temporary parity data for the j-th page data corresponding to the i−1th group of selected word lines from the host through the second interface, store the obtained temporary parity data in the selected second sub-region in way of overwriting, and update the state of the selected second sub-region to the awaiting encoding state;

In the process of storing the j-th page data, store the temporary parity data for the j-th page data in the selected second sub-region in way of overwriting;

After the storing of the j-th page data is complete, update the state of the selected second sub-region to an encoding complete state.

In some examples, the controller is further configured to: obtain configuration information of the memory; determine first buffer configuration information based on the configuration information of the memory, and send the first buffer configuration information to the host through the second interface;

The host is configured to: receive the first buffer configuration information through the first interface, configure the first buffer based on the first buffer configuration information, and the first buffer is to store temporary parity data received through the first interface.

In some examples, the controller is further configured to:

obtain configuration information of the memory;

determine second buffer configuration information based on the configuration information of the memory;

configure the second buffer based on the second buffer configuration information, and the second buffer is to store temporary parity data received by the controller through the second interface and temporary parity data currently generated by the controller.

In a second aspect, a controller is provided, the controller is coupled to a host and a memory respectively, the controller comprises a second interface, the memory comprises a plurality of memory planes, each memory plane of the plurality of memory planes comprises a plurality of word lines numbered according to the same rule, and each word line of the plurality of word lines is coupled to a plurality of memory strings;

The controller is configured to:

obtain target write data, the target write data comprises write data corresponding to a plurality of selected word lines respectively, and the plurality of selected word lines comprise word lines with target word line numbers in the plurality of memory planes;

In the process of storing the target write data in the memory strings coupled to the plurality of selected word lines respectively, send temporary parity data to the host through the second interface, and receive the temporary parity data sent from the host through the second interface to determine the target parity data for the target write data, the temporary parity data is the parity data generated in the process of determining the target parity data.

In some examples, the plurality of selected word lines comprises N groups of selected word lines, each group of selected word lines comprises n selected word lines, where n is greater than or equal to 1, and N is greater than 1;

The controller is configured to:

store the write data corresponding to each group of selected word lines in the N groups of selected word lines sequentially;

after the storing of the write data corresponding to the i-th group of selected word lines is complete, i is greater than or equal to 1, send the temporary parity data for the write data corresponding to the i-th group of selected word lines through the second interface;

determine the temporary parity data for the write data corresponding to the N-th group of selected word lines as the target parity data.

In some examples, i is greater than 1;

The controller is configured to: obtain temporary parity data for the write data corresponding to the i−1th group of selected word lines backed up on the host through the second interface, and determine the temporary parity data for the write data corresponding to the i-th group of selected word lines based on the obtained temporary parity data;

In some examples, the memory comprises at least one memory die, and each memory die of the at least one memory die comprises the plurality of memory planes;

The write data corresponding to each group of selected word lines comprises a plurality of page data numbered according to the same rule;

The controller further comprises a second buffer, the second buffer comprises at least one second region, the at least one second region corresponds to a memory die respectively, each second region comprises a plurality of second sub-regions, and the total number of second sub-regions in each second region is less than the total number of page data corresponding to a group of selected word lines, and each second sub-region is to store temporary parity data for a page data.

In some examples, the controller is further configured to:

obtain configuration information of the memory;

determine second buffer configuration information based on the configuration information of the memory;

configure the second buffer based on the second buffer configuration information;

wherein, the second buffer is to store temporary parity data received by the controller through the second interface and the currently generated temporary parity data.

In some examples, the controller is further configured to:

obtain configuration information of the memory;

determine first buffer configuration information based on the configuration information of the memory; and send the first buffer configuration information to the host through the second interface.

In a third aspect, a host is provided, the host is coupled to a controller, the controller is coupled to a memory, the host comprises a first interface, the memory comprises a plurality of memory planes, each memory plane of the plurality of memory planes comprises a plurality of word lines numbered according to the same rule, each word line of the plurality of word lines is coupled to a plurality of memory strings;

the host is configured to: receive temporary parity data sent by the controller through the first interface, store the received temporary parity data, and send the stored temporary parity data to the controller through the first interface;

wherein, the temporary parity data is parity data generated in the process of the controller determining the target parity data for the target write data, the target write data comprises write data corresponding to a plurality of selected word lines respectively, and the plurality of selected word lines comprises word lines with target word line numbers in the plurality of memory planes.

In some examples, the plurality of selected word lines comprises N groups of selected word lines, each group of selected word lines comprises n selected word lines, where n is greater than or equal to 1, and the N is greater than 1;

The host is configured to: receive temporary parity data for the write data corresponding to the i-th group of selected word lines through the first interface, where i is greater than or equal to 1, and store the temporary parity data for the write data corresponding to the i-th group of selected word lines.

In some examples, the memory comprises at least one memory die, each memory die of the at least one memory die comprises the plurality of memory planes;

The write data corresponding to each group of selected word lines comprises a plurality of page data numbered according to the same rule;

The host further comprises a first buffer, the first buffer comprises at least one first region, the at least one first region corresponds to a memory die, and each first region comprises a plurality of first sub-regions, and the plurality of first sub-regions correspond to a page number.

In some examples, the host is configured to:

When receiving temporary parity data for the j-th page data corresponding to the i-th group of selected word lines through the first interface, select a first sub-region from the first region corresponding to the target memory die based on the page number corresponding to the j-th page data, and the target memory die is a memory die to store the target write data;

store the received temporary parity data in the selected first sub-region in way of overwriting.

In some examples, the host is configured to:

receive first buffer configuration information through the first interface;

configure first buffer based on the first buffer configuration information, and the first buffer is to store the received temporary parity data.

In a fourth aspect, an operation method based on a memory system is provided, wherein the memory system comprises a host, a controller and a memory, wherein the host comprises a first interface, the controller comprises a second interface, and the memory comprises a plurality of memory planes, wherein each memory plane in the plurality of memory planes comprises a plurality of word lines numbered according to the same rule, and each word line in the plurality of word lines is coupled to a plurality of memory strings; the method comprises:

obtaining, by the controller, target write data, wherein the target write data comprises write data corresponding to a plurality of selected word lines respectively, wherein the plurality of selected word lines comprises word lines with target word line numbers in the plurality of memory planes, and the target memory die is one of the plurality of memory dies;

in the process of storing the target write data in the memory strings coupled to the plurality of selected word lines respectively, the controller swaps temporary parity data with the host through the second interface and the first interface to determine the target parity data for the target write data, wherein the temporary parity data is parity data generated in the process of determining the target parity data.

In the example of the present application, the host is configured with a first interface, and the controller is configured with a second interface. When the controller writes data to the memory, the controller swaps temporary parity data with the host through the second interface and the first interface. Compared with the swap of temporary parity data between the controller and the memory, the scheme for swapping temporary parity data between the controller and the host provided in the example of the present application can at least achieve the following technical effects:

(1) Since there is no need to buffer temporary parity data in the memory, the memory overhead can be reduced, thereby improving the OP (over proportion) of the memory;

(2) Since there is no need to swap temporary parity data between the memory and the controller, it is possible to avoid the swap of temporary parity data occupying the IO (input/output) bandwidth between the controller and the memory, thereby improving the performance of the controller and the memory;

(3) Since temporary parity data is swapped between the controller and the host, considering that the buffer space for storing temporary parity data on the host is large, most of the temporary parity data can be backed up to the host, and a small amount of temporary parity data can be stored in the controller, thereby reducing the controller's demand for buffer space such as SRAM (static random access memory), and correspondingly reducing the cost of SRAM on the controller;

(4) In the scheme for swapping temporary parity data between the controller and the memory, in order to avoid excessive occupation of the memory space of the memory by temporary parity data, parity data is only generated for the write data in the host write scenario for RAID (redundant array of independent disks) protection, but RAID protection is not performed on the write data in the garbage collection scenario. In the scheme for swapping temporary parity data between the controller and the host provided in the example of the present application, considering that the buffer space for storing temporary parity data on the host is relatively large, RAID protection can be performed not only on the write data in the host writing scenario, but also on the write data in the garbage collection scenario.

BRIEF DESCRIPTION OF THE DRAWINGS

In order to more clearly illustrate the technical solutions in the examples of the present application, the following will briefly introduce the drawings required for the description of the examples. Obviously, the drawings described below are only some examples of the present application. For ordinary people skilled in the art, other drawings can be obtained based on these drawings without creative work.

DETAILED DESCRIPTION

To make the purpose, technical solution and advantages of the present application clearer, the implementation of the present application will be further described in detail in conjunction with the accompanying drawings.

Figure 1:
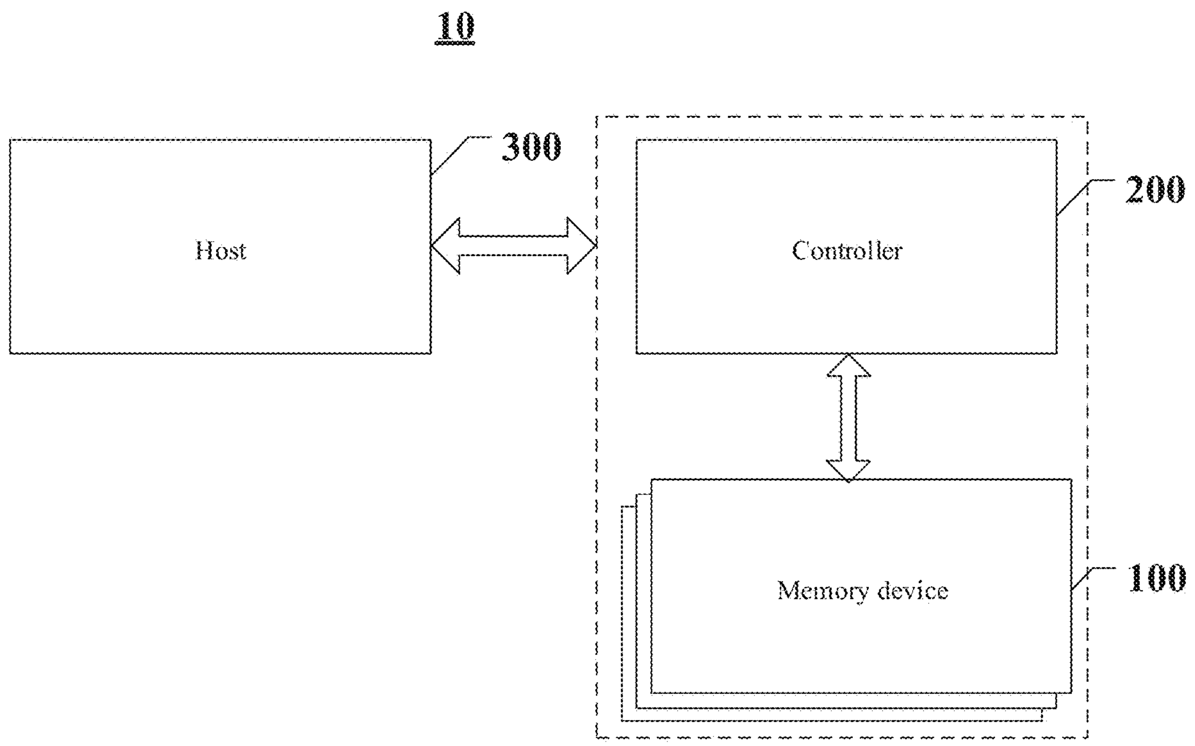
FIG. 1 is a schematic diagram of a memory system provided in an example of the present application.

FIG. 1 is a schematic diagram of a memory system 10 provided in an example of the present application. As shown in FIG. 1, the memory system 10 comprises: one or more memory 100, and a controller 200 coupled to the memory 100 and configured to control the memory 100.

The controller 200 can be configured to control the operations performed by the memory 100. Such as read, erase and program operations. The controller 200 can also be configured to manage various functions related to data stored or to be stored in the memory 100, including but not limited to bad block management, garbage collection, conversion of logical addresses to physical addresses, wear leveling, etc. In some examples, the controller 200 can also be configured to process error correction codes (ECC) for data read from or written to the memory 100. The controller 200 can also perform any other suitable functions. For example, formatting the memory 100.

The controller 200 can also communicate with external devices according to a specific communication protocol. For example, the controller 200 can communicate with the external device through at least one of various interface protocols. The interface protocol can be a Universal Serial Bus (USB) protocol, a Multi-Media Card (MMC) protocol, a Peripheral Component Interconnect (PCI) protocol, a PCI Express (PCI-E) protocol, an Advanced Technology Attachment (ATA) protocol, a Serial ATA protocol, a Parallel ATA protocol, a Small Computer System Interface (SCSI) protocol, an Enhanced Small Drive Interface (ESDI) protocol, an Integrated Development Environment (IDE) protocol, a Fire wire protocol, etc.

In some examples, the controller 200 and one or more memory 100 can be integrated into various types of electronic devices. The electronic device may be a mobile phone, a desktop computer, a laptop, a tablet, a vehicle computer, a game console, a printer, a positioning device, a wearable electronic device, a smart sensor, a virtual reality (VR) device, an augmented reality (AR) device, or any other suitable electronic device having a memory device therein. In this scenario, as shown in FIG. 1, the memory system 10 further comprises a host 300. The controller 200 is coupled to the host 300. The controller 200 may manage the data stored in the memory 100 and communicate with the host 300 to implement the functions of the aforementioned electronic device.

In further examples, the controller 200, and one or more memory 100 may be integrated into various types of memory devices.

Figure 2:
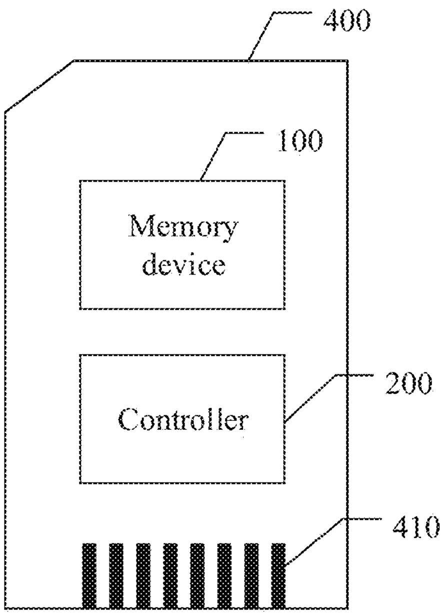
FIG. 2 is a schematic diagram of a memory device provided in an example of the present application.

As an example, as shown in FIG. 2, the controller 200 and a single memory 100 may be integrated into a memory card 400. The memory card 400 may comprise a PCMCIA (PC) card, a Compact Flash (CF) card, a Smart Media (SM) card, a memory stick, a Multi-Media Card (MMC), a RS-MMC, a micro-MMC, a Secure Digital (SD) card, a Universal Flash Storage (UFS), etc. As shown in FIG. 2, the memory card 400 may also comprise a connector 410 for coupling the memory card 400 with a host.

Figure 3:
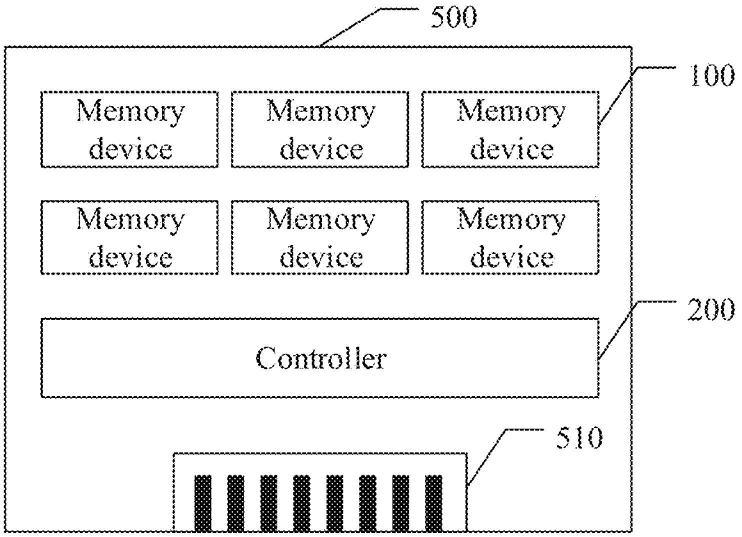
FIG. 3 is a schematic diagram of another memory device provided in an example of the present application.

As another example, as shown in FIG. 3, the controller 200 and a plurality of memory 100 may be integrated into a solid-state drive (SSD) 500. The solid-state drive 500 may also comprise a connector 510 for coupling the solid-state drive 500 with a host. Wherein, the storage capacity and/or operating speed of the solid-state drive 500 is greater than the storage capacity and/or operating speed of the memory card 400.

In addition, the memory 100 in FIGS. 1 to 3 may be of any memory related to the examples of the present application. For example, it can be a 3D NAND (NAND gate) memory. The structure of the memory 100 is explained below.

Figure 4:
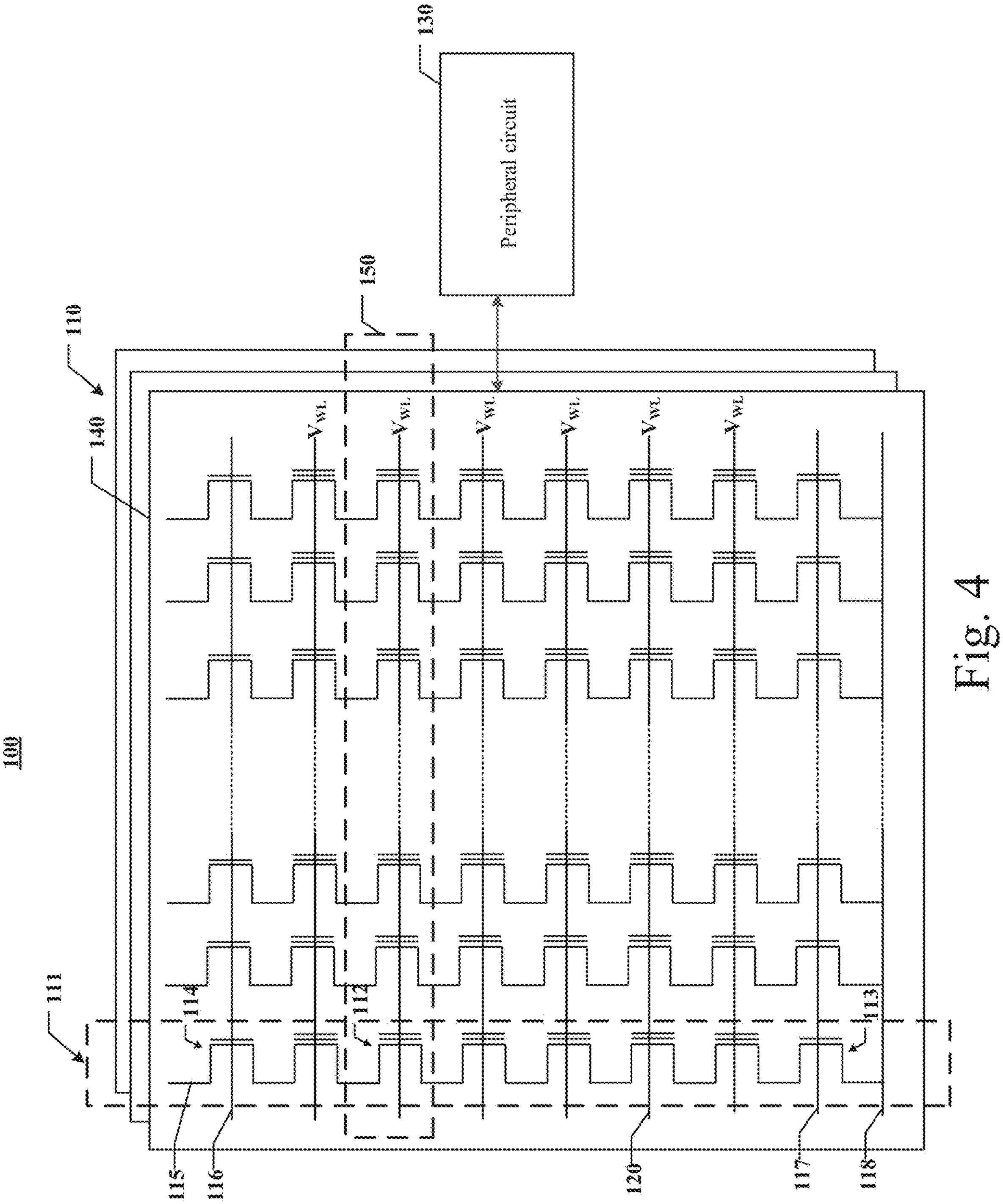
FIG. 4 is a schematic diagram of a memory provided in an example of the present application.

FIG. 4 is a schematic diagram of a memory 100 provided in an example of the present application. As shown in FIG. 4, the memory 100 comprises:

A memory array 110, the memory array 110 comprises a plurality of memory cell rows;

A plurality of word lines 120, the plurality of word lines 120 are respectively coupled to the plurality of memory cell rows;

A peripheral circuit 130, the peripheral circuit 130 is coupled to the plurality of word lines 120 and is configured to perform operations such as programming (e.g., writing data) or reading data on a selected memory cell row among the plurality of memory cell rows, the selected memory cell row being the memory cell row coupled to the selected word line, wherein, in order to perform operations such as programming or reading data, the peripheral circuit 130 is configured to perform the operation method of the memory provided in the example of the present application.

The memory array 110 can be a NAND flash memory array. As shown in FIG. 1, the NAND flash memory array comprises a plurality of memory strings 111, the memory strings 111 are arranged in an array on a substrate, and each memory string 111 extends vertically above the substrate (not shown). In some examples, each memory string 111 comprises a plurality of memory cells 112 coupled in series and stacked vertically.

As shown in FIG. 4, each memory string 111 may also comprise a source select gate (SSG) 113 at the bottom and a drain select gate (DSG) 114 at the top. The source select gate is also called a bottom select gate, a bottom select gate (BSG) or a source select gate, and the drain select gate is also called an upper select gate, a top select gate (TSG) or a drain select gate. The source select gate 113 and the drain select gate 114 may be configured to activate the selected memory string 111 during read and program operations.

In some examples, the drain select gate 114 of each memory string 111 is coupled to a corresponding bit line 115, and data may be read or written from the bit line 115 via an output bus (not shown).

In some examples, each memory string 111 is configured to apply a selection voltage (e.g., higher than the threshold voltage of the transistor having the drain select gate 114) or a deselection voltage (e.g., 0V) to the corresponding drain select gate 114 through one or more DSG lines 116. And/or, in some examples, each memory string 111 is configured to be selected or deselected by applying a selection voltage (e.g., higher than the threshold voltage of the transistor having the source select gate 113) or a deselection voltage (e.g., 0V) to the corresponding source select gate 113 through one or more SSG lines 117.

As shown in FIG. 4, the memory string 111 can be organized into a plurality of blocks 140. For any one of the plurality of blocks 140, the block 140 can have a source line (SL) 118, through which the sources of all the memory strings 111 in the block 140 are coupled, and the source line is also referred to as a common source line or an array common source (ACS).

Wherein, the source line 118 can be used for grounding to realize the grounding of the source of each memory cell of the memory string in the block 140 in some subsequent operations. In some examples, in some other operations, the source of each memory cell of the memory string in the block 140 can also be connected to a high voltage through the source line 118.

Wherein, each block 140 is a basic data unit for the erase operation, for example, all memory cells 112 on the same block 140 are erased at the same time. In order to erase the memory cells 112 in the selected block, the source line coupled to the selected block can be biased with an erase voltage (Vers) (for example, a high positive voltage (20V or higher)).

It should be understood that in other examples, the erase operation can be performed at the half-block level, at the quarter-block level, or at any suitable number of blocks or any suitable fraction of the block.

As shown in FIG. 4, the same layer of memory cells 112 of adjacent memory strings 111 in the same block 140 can be coupled through word lines 120, and word lines 120 are used to select which layer of memory cells 112 in the block 140 is affected by the read and programming operations.

In some examples, each word line 120 is coupled to a page 150 to which the memory cell 112 belongs, and page 150 is a basic data unit for programming operations. Wherein, the size of page 150 can be related to the number of memory strings 111 coupled by word lines 120 in a block 140. Each word line 120 can be coupled to the control gate (e.g., gate electrode) of each memory cell 112 in the corresponding page 150. It can be understood that a memory cell row is a plurality of memory cells 112 located in the same page 150.

It should be noted that the same layer of memory cells in a block 140 corresponds to the same word line, but the same layer of memory cells can be divided into one or more pages. For example, one word line can be coupled to one or more pages. For example, for SLC, one word line is coupled to one page, and for MLC, one word line is coupled to two pages.

Figure 5:
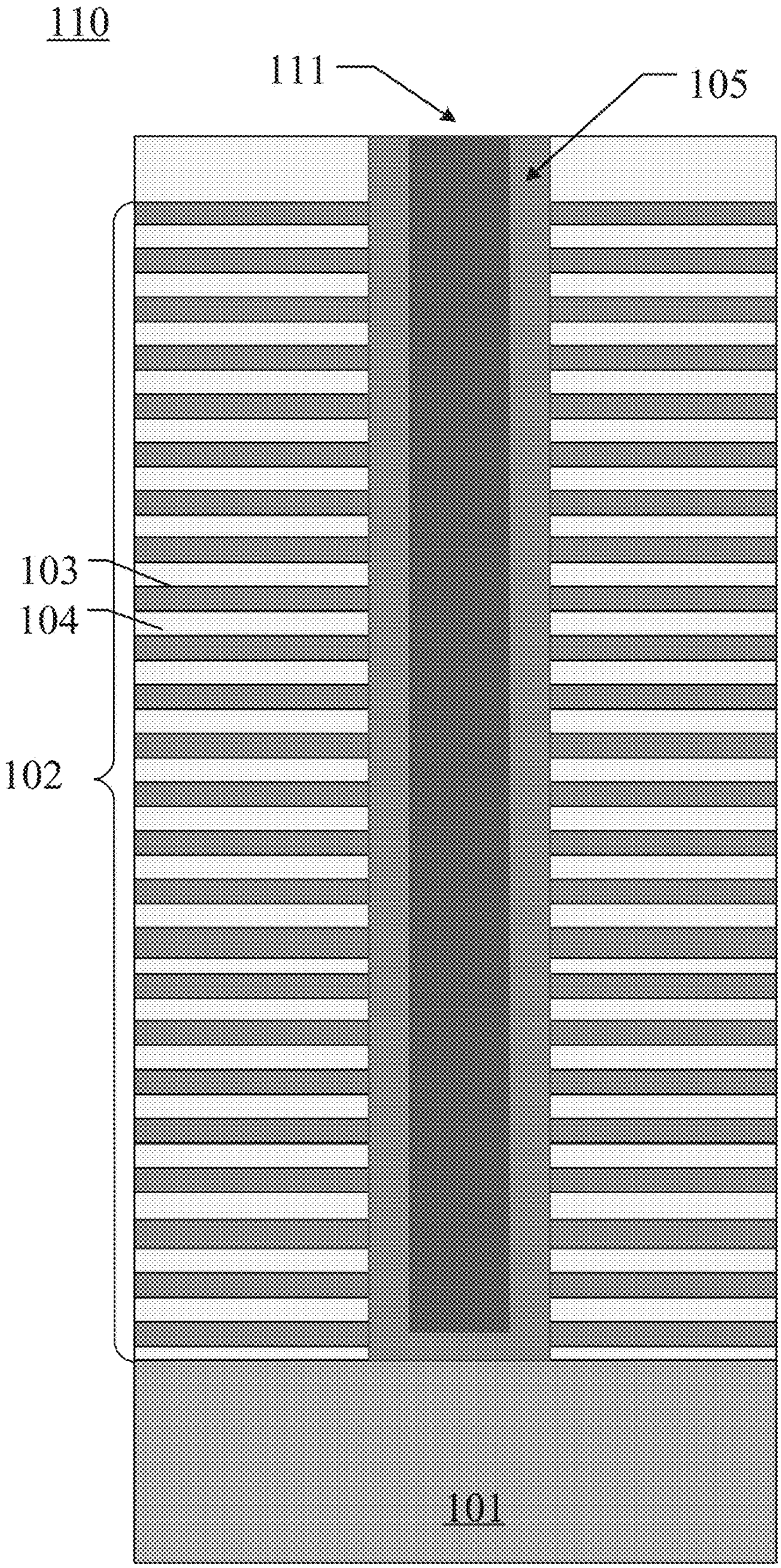
FIG. 5 is a cross-sectional schematic diagram of a memory array comprising a memory string provided in an example of the present application.

FIG. 5 is a cross-sectional schematic diagram of a memory array 110 comprising a memory string 111 provided in an example of the present application. As shown in FIG. 5, the memory string 111 may extend vertically above the substrate 101 and pass through the stacked layer 102. The substrate 101 may comprise silicon (e.g., single crystal silicon), silicon germanium (SiGe), gallium arsenide (GaAs), germanium (Ge), silicon on insulator (SOI), germanium on insulator (GOI), or any other suitable material.

The stacked layer 102 may comprise alternating gate conductive layers 103 and gate-to-gate dielectric layers 104. The number of pairs of gate conductive layers 103 and gate-to-gate dielectric layers 104 in the stacked layer 102 may determine the number of memory cells 112 in the memory array 110.

The gate conductive layer 103 may comprise a conductive material, including but not limited to tungsten (W), cobalt (Co), copper (Cu), aluminum (Al), polysilicon, doped silicon, silicide, or any combination thereof. In some examples, each gate conductive layer 103 comprises a metal layer, such as a tungsten layer. In other examples, each gate conductive layer 103 comprises a doped polysilicon layer. In addition, each gate conductive layer 103 may comprise a control gate surrounding the memory cell 112, and may extend laterally at the top of the stacked layer 102 as a DSG line 116, extend laterally at the bottom of the stacked layer 102 as an SSG line 117, or extend laterally between the DSG line 116 and the SSG line 117 as a word line 120.

As shown in FIG. 5, the memory string 111 comprises a channel structure 105 extending vertically and passing through the stacked layer 102. In some examples, the channel structure 105 comprises a channel hole filled with (one or more) semiconductor materials (e.g., as a semiconductor channel) and (one or more) dielectric materials (e.g., as a storage film). The semiconductor channel comprises silicon, such as polysilicon. The storage film is a composite dielectric layer comprising a tunneling layer, a storage layer (also called a "charge trapping/storage layer"), and a blocking layer.

In some examples, the channel structure 105 has a cylindrical shape (e.g., a column shape). The layers in the semiconductor channel and the storage film are arranged radially in this order from the center of the cylinder toward the outer surface of the cylinder.

It should be understood that although not shown in FIG. 5, the memory array 110 may also comprise other additional components, including but not limited to gate line gaps/source contacts, local contacts, interconnect layers, etc.

Returning to FIG. 4, the peripheral circuit 130 may be coupled to the memory array 110 through the bit line 115, the word line 120, the source line 118, the SSG line 117, and the DSG line 116. The peripheral circuit 130 may comprise any suitable analog, digital, and mixed signal circuits for facilitating the operation of the memory array 110 by applying voltage signals and/or current signals to the memory cell 112 and sensing voltage signals and/or current signals from the memory cell 112 via the bit line 115, the word line 120, the source line 118, the SSG line 117, and the DSG line 116.

Figure 6:
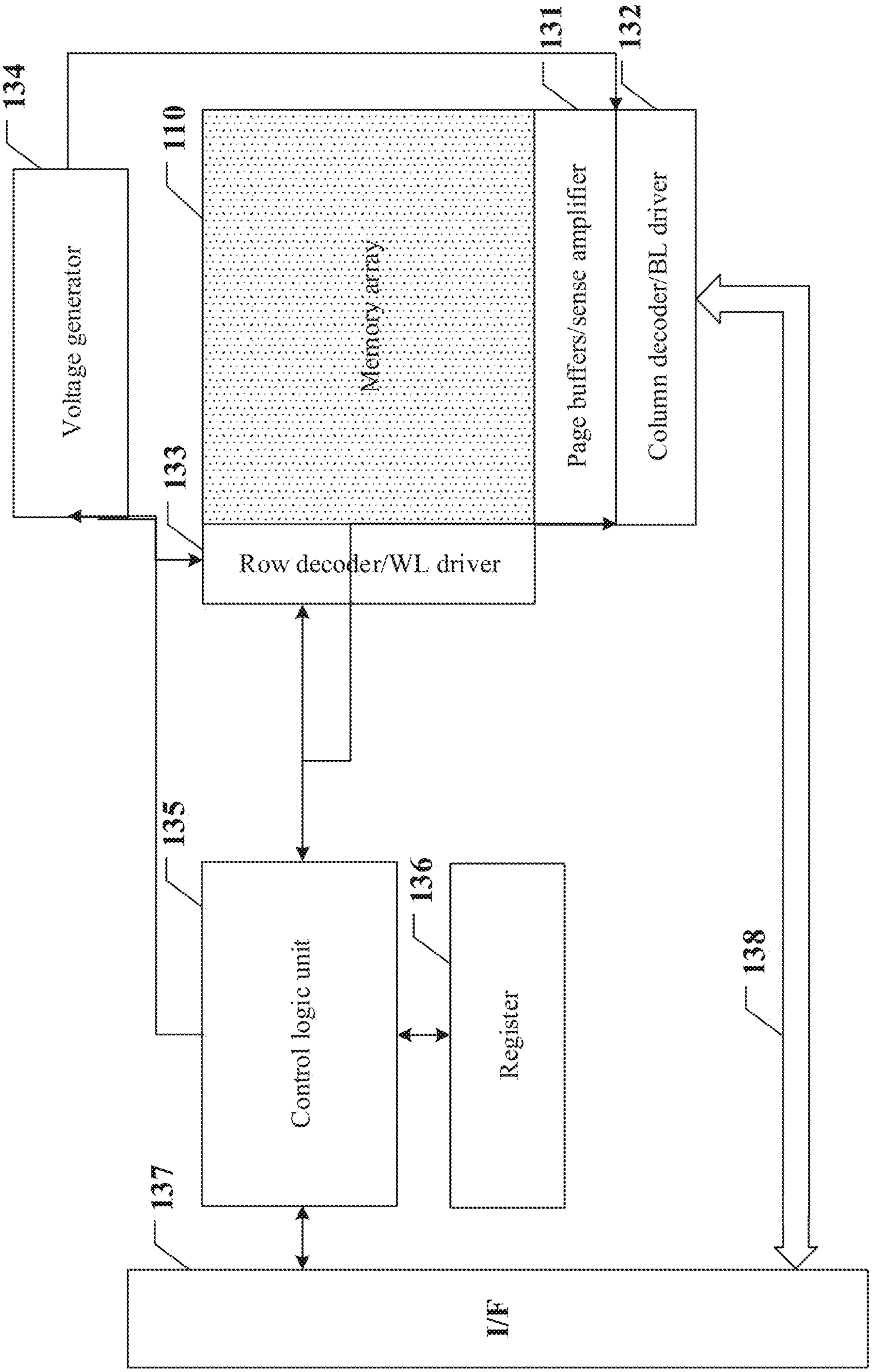
FIG. 6 is a schematic diagram of a peripheral circuit provided in an example of the present application.

The peripheral circuit 130 may comprise various types of peripheral circuits formed using metal-oxide-semiconductor (MOS) technology. For example, FIG. 6 shows some exemplary peripheral circuits 130, which comprise page buffers/sense amplifiers 131, column decoders/bit line (BL) drivers 132, row decoders/word line (WL) drivers 133, voltage generators 134, control logic unit 135, register 136, interfaces 137, and data buses 138. It should be understood that in some examples, additional peripheral circuits not shown in FIG. 6 may also be included.

The page buffers/sense amplifiers 131 may be configured to read data from the memory array 110 and program (write) data to the memory array 110 according to control signals from the control logic unit 135. For example, the page buffers/sense amplifiers 131 may store a page of programming data (write data) to be programmed into a page 150 of the memory array 110. The page buffers/sense amplifiers 131 may also perform parity operations to ensure that the data has been correctly programmed into the memory cells 112 coupled to the selected word lines 120. The page buffer/sense amplifier 131 may also sense a low power signal from the bit line 115, which represents a data bit stored in the memory cell 112, and amplify a small voltage swing to a recognizable logic level in a read operation.

The column decoder/bit line driver 132 may be configured to be controlled by the control logic unit 135, and select one or more memory strings 111 by applying a bit line voltage generated from the voltage generator 134.

The row decoder/word line driver 133 may be configured to be controlled by the control logic unit 135, and select/deselect a block 140 of the memory array 110, and select/deselect a word line 120 of the block 140. The row decoder/word line driver 133 may also be configured to drive the word line 120 using a word line voltage (VWL) generated from the voltage generator 134. In some examples, the row decoder/word line driver 133 may also select/deselect and drive the SSG line 117 and the DSG line 116. As described in detail below, the row decoder/word line driver 133 is configured to perform an erase operation on the memory cell 112 coupled to the (one or more) selected word lines 120.

The voltage generator 134 may be configured to be controlled by the control logic unit 135 and generate word line voltages (e.g., read voltages, program voltages, pass voltages, local voltages, parity voltages, etc.), bit line voltages, and source line voltages to be supplied to the memory array 110.

The control logic unit 135 may be coupled to each of the peripheral circuits described above and configured to control the operation of each of the circuits.

The register 136 may be coupled to the control logic unit 135, and the register may comprise a status register, a command register, and an address register for storing status information, a command operation code (OP code), and a command address for controlling the operation of each circuit in the peripheral circuit.

The interface (I/F) 137 can be coupled to the control logic unit 135 and act as a control buffer to buffer control commands received from a host (not shown) and relay them to the control logic unit 135, and buffer status information received from the control logic unit 135 and relay them to the host. The interface 137 can also be coupled to the column decoder/bit line driver 132 via the data bus 138, and act as a data I/O interface and data buffer to buffer data and relay it to or from the memory array 110.

The description of the above memory-related hardware example has similar beneficial effects as the following method example. For technical details not disclosed in the memory-related hardware example, please refer to the description of the method example of this application for understanding.

In addition, in order to improve the operating efficiency of the memory, the memory shown in FIGS. 1 to 4 may comprise one memory die or a plurality of memory dies. For example, the memory provided in the example of the present application comprises at least one memory die. Wherein, each memory die in at least one memory die comprises a plurality of memory planes, each memory plane in the plurality of memory planes comprises a plurality of word lines numbered according to the same rule, and each word line in the plurality of word lines is coupled to a plurality of memory strings.

Figure 7:
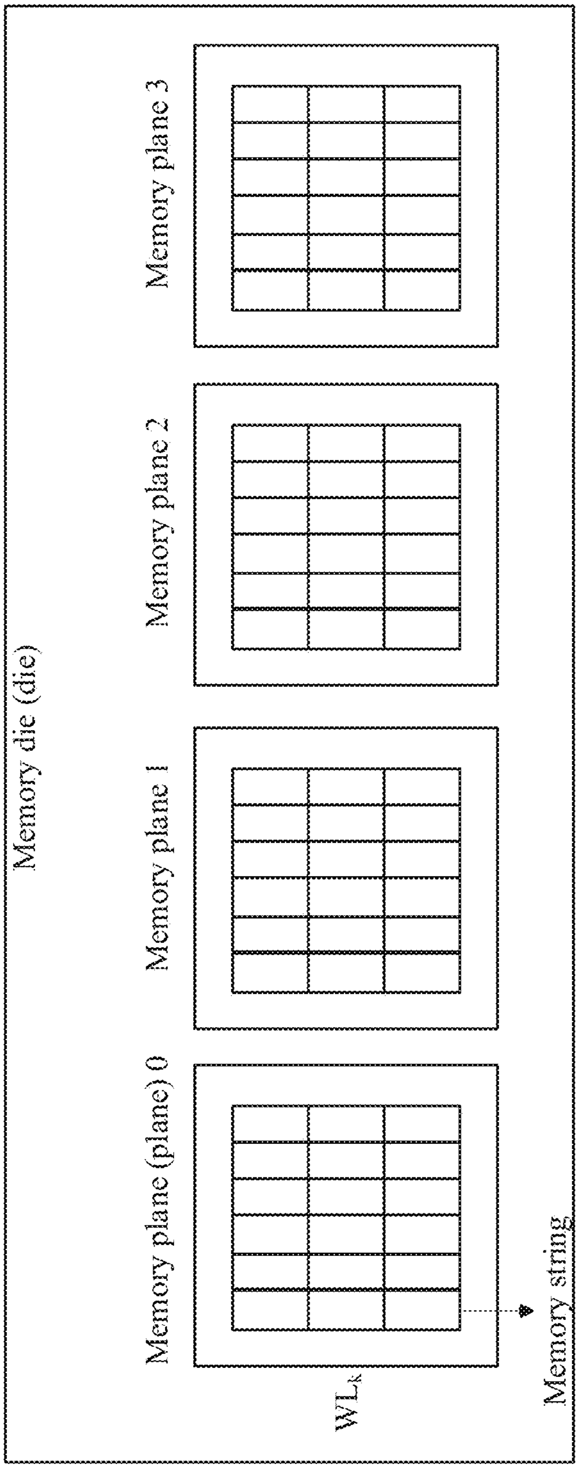
FIG. 7 is a schematic diagram of a memory die provided in an example of the present application.

FIG. 7 is a schematic diagram of a memory die provided in an example of the present application. As shown in FIG. 7, the memory die comprises four memory planes, which are marked as memory plane 0, memory plane 1, memory plane 2, and memory plane 3. Each memory plane comprises a plurality of word lines numbered according to the same rule, for example, each memory plane comprises a plurality of word lines such as WL1, WL2, WL3, WL4 . . . , and the schematic diagram of each memory plane along the WLk word line direction is given as an example in FIG. 7.

As shown in FIG. 7, in each memory plane, the WLk word line is coupled to 6 memory strings. Each column of squares in FIG. 7 represents a memory string. It should be noted that a memory string in FIG. 7 is different from a memory string 111 in FIG. 4. A memory string in FIG. 7 comprises a plurality of memory strings 111 connected to the same DSG 114 in the memory plane.

In addition, each square in the memory string in FIG. 7 represents a logical page, and the number of logical pages comprised in each memory string is related to the type of storage unit in the memory. For example, when the storage unit in the memory is TLC (Triple-Level Cell), each memory string comprises 3 logical pages, and FIG. 7 takes TLC as an example. For another example, when the storage unit in the memory is MLC (Multi-Level Cell), each memory string comprises 2 logical pages.

In a scenario where memory comprises at least one memory die, when the controller operates the memory, different memory dies can be operated in parallel. For example, when the controller writes data to a certain memory die, it simultaneously performs garbage collection on the data in another memory die, thereby improving the operation efficiency of the memory.

Moreover, when operating a certain memory die, since the interference between the memory strings coupled to the word lines with the same word line number in different memory planes is small, the controller can operate the memory strings coupled to word lines with the same word line number in different memory planes together, further improving the operation efficiency.

For example, when the controller writes data to a certain memory die, according to the word line number, the controller sequentially performs programming operations on the memory strings coupled to word lines with the same word line number in different memory planes. For example, for the memory die shown in FIG. 7, when the controller writes data to the memory die, it firstly writes data to the memory strings coupled with WL1 in four memory planes, and then writes data to the memory strings coupled with WL2 in four memory planes . . . , and so on.

Moreover, for each word line number, the controller generates the same parity data according to the data in the memory strings coupled to the word lines with the word line number in different memory planes. For example, the data in the memory strings coupled to word lines with the same word line number in different memory planes corresponds to the same parity data. For example, for the memory die shown in FIG. 7, the data in the memory strings coupled with WLk in four memory planes corresponds to the same parity data.

In addition, the data in the memory strings coupled with the word lines with the same word line number in different memory planes are stored sequentially according to certain rules. Therefore, in the process of storing these data, the controller can generate temporary parity data when storing the current data, and regenerate new temporary parity data based on the temporary parity data generated before the current time when storing other data later, until the data are stored and the final parity data is obtained.

It can be seen that a large amount of temporary parity data is generated in the process of obtaining the parity data by the controller, and the currently generated temporary parity data will be used in the subsequent process of generating the parity data. However, the memory space of the controller is limited, so the controller needs to back up these temporary parity data to other devices in the process of generating the parity data, and restore these temporary parity data from other devices in the subsequent process. For example, the controller needs to swap temporary parity data (swap parity) with other devices in the process of generating the parity data.

Figure 8:
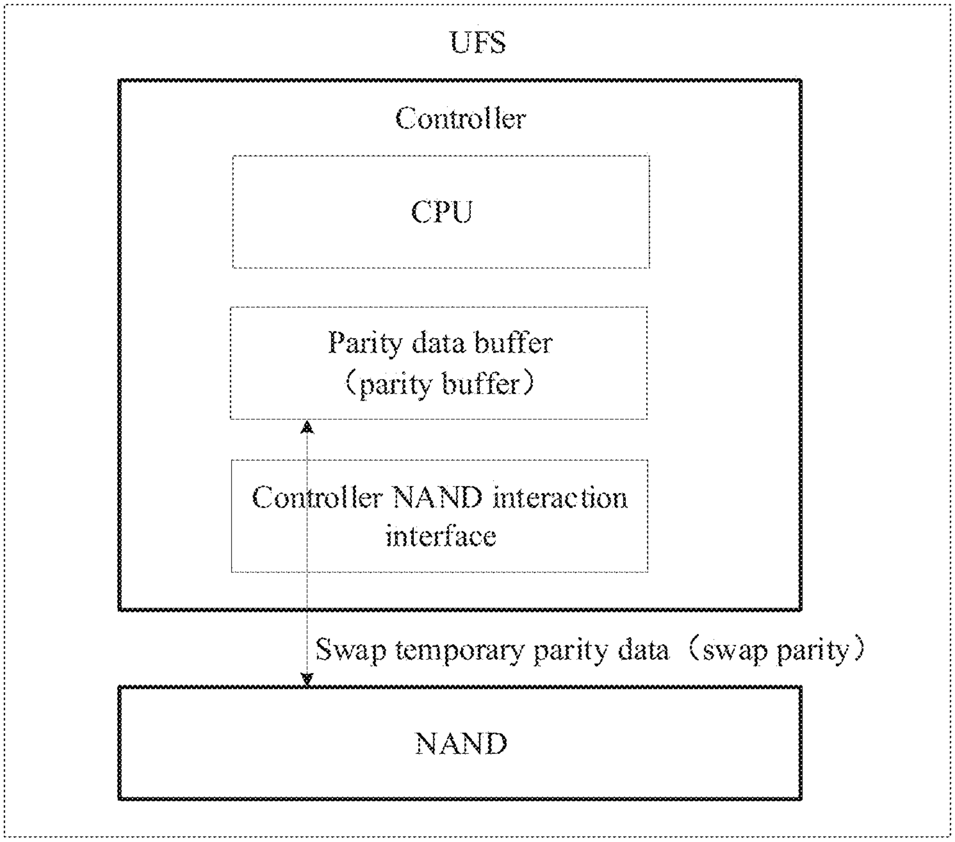
FIG. 8 is a schematic diagram of swapping temporary parity data between a controller and a memory provided in an example of the present application.

In some technologies, the controller can swap temporary parity data with the memory. FIG. 8 is a schematic diagram of swapping temporary parity data between a controller and a memory provided in an example of the present application. As shown in FIG. 8, UFS (universal flash storage) comprises a controller and NAND, and the controller comprises a CPU (central processing unit), a parity data buffer, and a controller-NAND interaction interface.

When the CPU of the controller writes data to NAND, it buffers the currently generated temporary parity data in the parity data buffer, and backs up the temporary parity data in the parity data buffer to NAND through the controller-NAND interaction interface. When the temporary parity data is needed later, the temporary parity data backed up on NAND is restored to the parity data buffer through the controller-NAND interaction interface.

In the scheme shown in FIG. 8, since the temporary parity data needs to be backed up on NAND, the space on NAND for storing write data is reduced, thereby affecting the performance of NAND. Moreover, in the process of swapping temporary parity data between the controller and NAND, the IO (input/output) bandwidth between the controller and NAND needs to be occupied, thereby affecting the performance of UFS.

In some scenarios, the following two technologies can be used to reduce the impact of the scheme shown in FIG. 8 on NAND performance.

Technology 1: Increase the space of SRAM on the controller to increase the capacity of the parity data buffer, thereby reducing the amount of temporary parity data that needs to be backed up to NAND. However, this technology causes the size of the SRAM of the controller to increase, which in turn causes the manufacturing cost of the SRAM of the controller to increase.

Technology 2: Perform RAID protection only on the parity data generated by part of the write data, such as only performing RAID (redundant array of independent disks) protection on the write data in the host write scenario, and abandoning RAID protection on the write data in the garbage collection scenario, thereby reducing the amount of temporary parity data that needs to be backed up to NAND. However, this solution ensures the security of the write data in the garbage collection scenario at the cost of verifying or reperform the garbage collection.

Wherein, the host write scenario can be understood as writing data to the memory by the user through the host. The garbage collection scenario can be understood as: integrating the scattered data originally stored in the memory string coupled with a plurality of word lines into the memory string coupled with the specified word line.

Based on this, the example of the present application provides a memory system, a controller, a host and an operation method. In the example of the present application, a first interface is configured on the host and a second interface is configured on the controller. When the controller writes data to the memory, the controller swaps temporary parity data with the host through the second interface and the first interface. Compared with the swap of temporary parity data between the controller and the memory, the scheme of swapping temporary parity data between the controller and the host provided in the example of the present application can at least achieve the following technical effects:

(1) Since there is no need to buffer temporary parity data in the memory, the memory overhead can be reduced, thereby improving the OP (over proportion) of the memory; wherein OP can be understood as the ratio between the size of the write data stored in the memory and the total memory space of the memory.

(2) Since there is no need to swap temporary parity data between the memory and the controller, it is possible to avoid the IO bandwidth between the controller and the memory occupied by the swap of temporary parity data, thereby improving the performance of the controller and the memory.

(3) Since the temporary parity data is swapped between the controller and the host, considering that the buffer space for storing temporary parity data on the host is large, most of the temporary parity data can be backed up on the host, and a small amount of temporary parity data can be stored at the controller, thereby reducing the controller's demand for buffer space such as SRAM (static random access memory), and correspondingly reducing the cost of SRAM on the controller.

(4) In the scheme of swapping temporary parity data between the controller and the memory, in order to avoid the temporary parity data occupying too much memory space of the memory, parity data is generated only for the write data in the host write scenario for RAID protection, and RAID protection is not performed on the write data in the garbage collection scenario. In the scheme of swapping temporary parity data between the controller and the host provided in the example of the present application, considering that the buffer space for storing temporary parity data on the host is large, RAID protection can be performed not only on the write data in the host write scenario, but also on the write data in the garbage collection scenario.

The memory system, controller, host, and operation method provided in the example of the present application are explained below.

Figure 9:
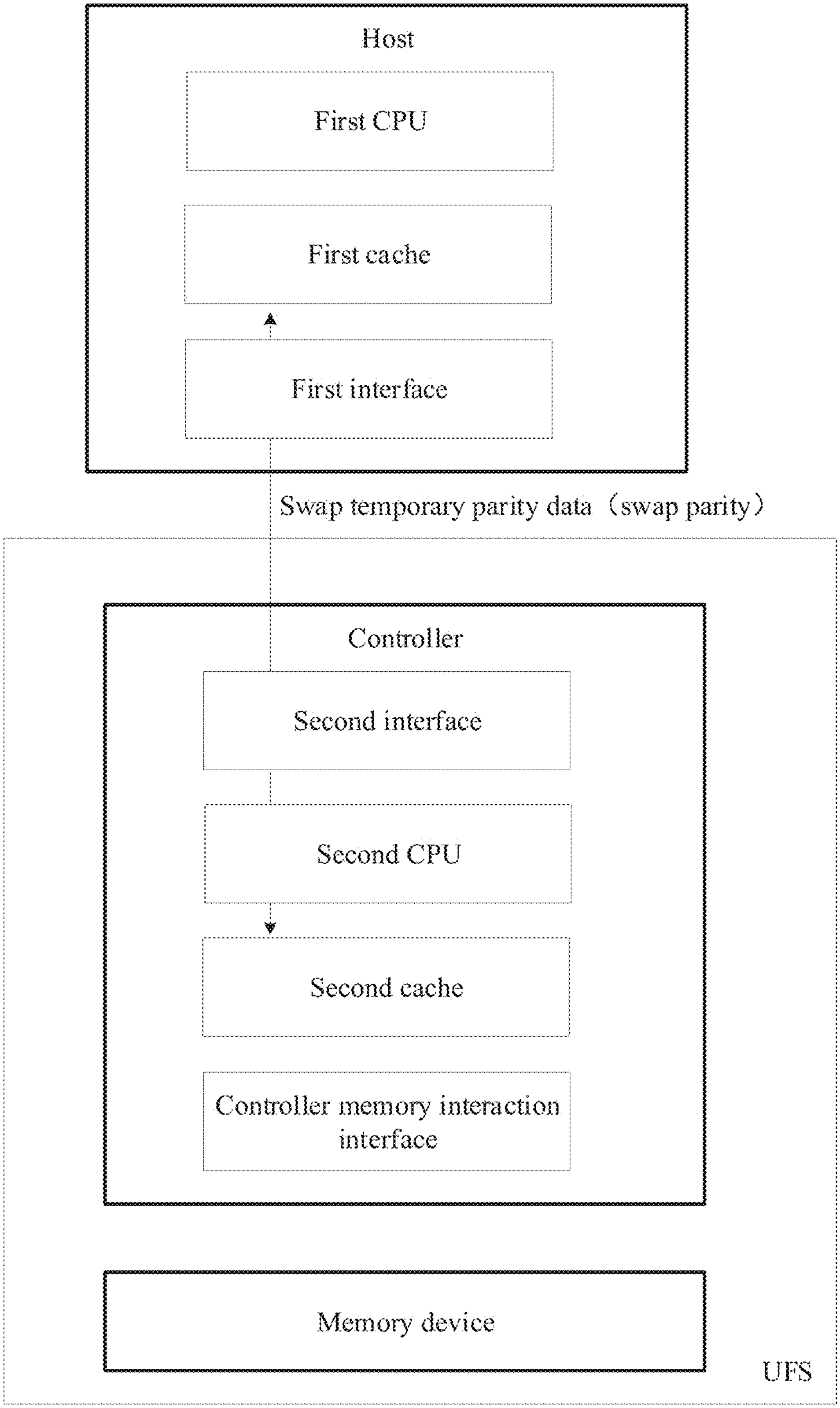
FIG. 9 is a schematic diagram of the architecture of a memory system provided in an example of the present application.

FIG. 9 is a schematic diagram of the architecture of a memory system provided in the example of the present application. As shown in FIG. 9, the memory system comprises a host, a controller, and a memory, and the controller and the memory constitute UFS in way of example. Wherein, the memory may be a memory of a type such as NAND, and the example of the present application does not limit the type of memory.

As shown in FIG. 9, the host comprises a first CPU, a first buffer, and a first interface, and the controller comprises a second CPU, a second buffer, a second interface, and a controller-memory interaction interface.

Wherein, the first CPU and the second CPU comprise FW (firmware), and the FW is to implement the method provided in the example of the present application. For example, the FW comprises instructions for implementing the method provided in the example of the present application, and the first CPU and the second CPU implement the method provided in the example of the present application by executing these instructions.

In some examples, in the process of writing data to the memory device by the second CPU through the controller-memory interaction interface, the currently generated temporary parity data is buffered in the second buffer. The second CPU backs up the temporary parity data in the second buffer to the first buffer through the second interface and the first interface according to certain rules. When the second CPU needs to back up the temporary parity data later, it restores the required temporary parity data from the first buffer through the second interface and the first interface. The detailed implementation method is explained in the subsequent method example, and will not be explained here first.

For example, the first buffer is to store the temporary parity data received by the host through the first interface. The second buffer is to store the temporary parity data received by the controller through the second interface and the currently generated temporary parity data.

Wherein, the temporary parity data currently generated by the controller can be understood as the temporary parity data generated by the controller before the current time and within the most recent period of time from the current time. The larger the capacity of the second buffer is, the more temporary parity data generated by the controller in the most recent period of time can be buffered. How to back up the temporary parity data in the second buffer to the first buffer is explained in detail in the subsequent method example, which will not be repeated here.

Since the temporary parity data received by the controller through the second interface is the temporary parity data that needs to be used in the most recent period of time after the current time, the temporary parity data received by the controller through the second interface and the currently generated temporary parity data can also be collectively referred to as the most recently used temporary parity data, for example, the second buffer is to store the most recently used temporary parity data for the controller.

In addition, the first buffer may be a portion of buffer space split from the memory of the host, and the second buffer may be a portion of buffer space split from the memory of the controller. For the convenience of subsequent description, the memory of the host is referred to as the first memory, and the memory of the controller is referred to as the second memory.

wherein, the first memory and the second memory may be memory devices such as SRAM, and the example of the present application does not limit the types of the host and memory of the controller.

In some examples, in order to avoid the high manufacturing cost caused by the large size of the second memory of the controller, the capacity of the first buffer is greater than the capacity of the second buffer. For example, a small amount of temporary parity data is stored in the second buffer, and most of the temporary parity data is backed up to the first buffer.

Figure 10:
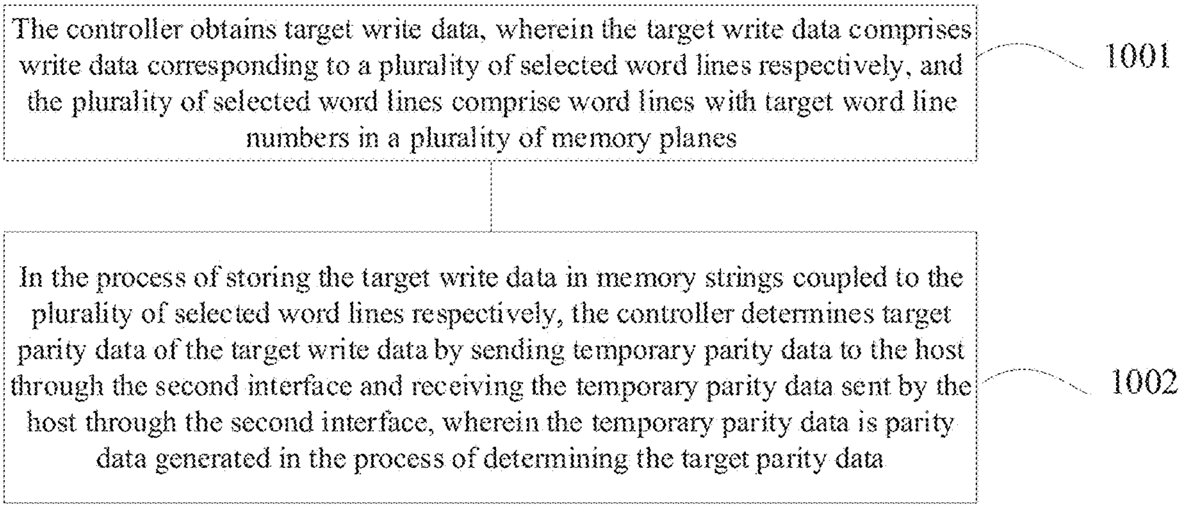
FIG. 10 is a flowchart of a method for operating a controller provided in an example of the present application.

FIG. 10 is a flow chart of an operation method of a controller provided in an example of the present application. The method applies the controller shown in FIG. 9, as shown in FIG. 10, and the method comprises the following operations.

Operation 1001: The controller obtains target write data, the target write data comprises write data corresponding to a plurality of selected word lines, and the plurality of selected word lines comprise word lines with target word line numbers in a plurality of memory planes.

Operation 1002: In the process of storing the target write data to the memory strings coupled to the plurality of selected word lines respectively by the controller, the controller sends temporary parity data to the host through the second interface and receives the temporary parity data sent from the host through the second interface to determine the target parity data for the target write data, and the temporary parity data is the parity data generated in the process of determining the target parity data.

Through the operations shown in FIG. 10, the controller and the host can swap temporary parity data to achieve the aforementioned technical effect.

Figure 11:
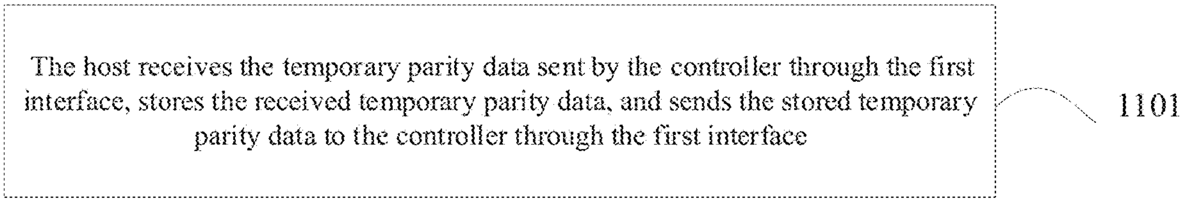
FIG. 11 is a flowchart of a method for operating a host provided by an example of the present application.

FIG. 11 is a flow chart of an operation method of a host provided by an example of the present application. The method applies the host shown in FIG. 9, as shown in FIG. 11, and the method comprises the following operations.

Operation 1101: The host receives the temporary parity data sent by the controller through the first interface, stores the received temporary parity data, and sends the stored temporary parity data to the controller through the first interface.

Wherein, the temporary parity data is the parity data generated in the process of determining the target parity data for the target write data by the controller, the target write data comprises the write data corresponding to the plurality of selected word lines respectively, and the plurality of selected word lines comprise the word lines with the target word line numbers in the plurality of memory planes.

Through the operations shown in FIG. 11, the host and the controller can swap temporary parity data to achieve the aforementioned technical effect.

Figure 12:
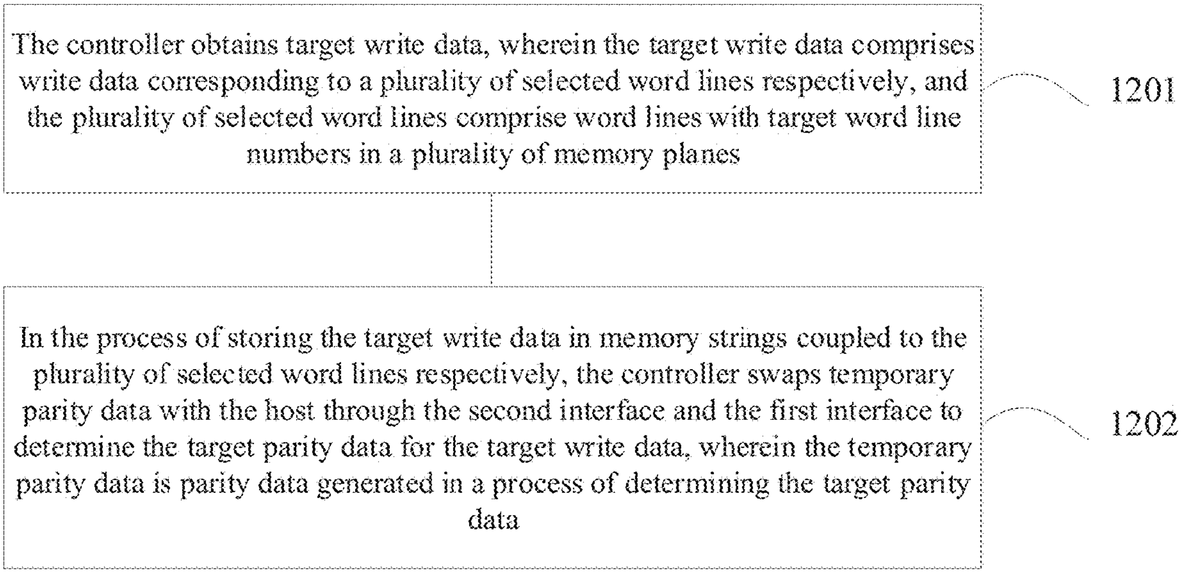
FIG. 12 is a flowchart of a method for operating a memory system provided by an example of the present application.

FIG. 12 is a flow chart of an operation method of a memory system provided by an example of the present application. The method applies the memory system shown in FIG. 9, as shown in FIG. 12, and the method comprises the following operations.

Operation 1201: The controller obtains target write data, the target write data comprises write data corresponding to a plurality of selected word lines, and the plurality of selected word lines comprise word lines with target word line numbers in a plurality of memory planes.

Wherein, when the memory comprises a memory die, the plurality of memory planes in operation 1201 can be understood as all memory planes in the memory. When the memory comprises a plurality of memory dies, the plurality of memory planes in operation 1201 can be understood as a plurality of memory planes in a certain memory die, for example, the target write data is currently written to the memory die. The memory die in which the target write data is stored later referred to as the target memory die.

The plurality of selected word lines comprises word lines with target word line numbers in a plurality of memory planes, which can be understood as: the plurality of selected word lines are word lines with word line numbers in a plurality of memory planes that are all target word line numbers. For example, for the memory die shown in FIG. 7, the target word line number is WLk, and the plurality of selected word lines comprise the word line WLk in memory plane 0, the word line WLk in memory plane 1, the word line WLk in memory plane 2, and the word line WLk in memory plane 3.

In addition, the method provided in the example of the present application can be used to perform RAID protection on the write data in the host write scenario. In this scenario, the controller obtains the target write data in the following manner: the controller receives the target write data from the host, and the target write data is the data to be written by the user.

In some examples, the method provided in the example of the present application can also perform RAID protection on the write data in the garbage collection scenario. In this scenario, the controller obtains the target write data in the following manner: the controller reads data from the memory strings coupled to the word lines corresponding to the plurality of word line numbers in each memory plane, integrates the read data, and obtains the target write data.

Operation 1202: In the process of storing the target write data to the memory strings coupled to the plurality of selected word lines respectively, the controller swaps temporary parity data with the host through the second interface and the first interface to determine the target parity data for the target write data, and the temporary parity data is the parity data generated in the process of determining the target parity data.

Since the target write data comprises write data corresponding to the plurality of selected word lines respectively, and the plurality of selected word lines are word lines with target word line numbers in a plurality of memory planes, the process of storing the target write data to the memory strings coupled to the plurality of selected word lines respectively can be understood as: the controller starts from storing the write data corresponding to the word line with the target word line number in the first memory plane to storing the write data corresponding to the word line with the target word line number in the last memory plane.

For example, for the memory die shown in FIG. 7, the process of storing the target write data to the memory strings coupled to the plurality of selected word lines respectively can be understood as: starting from storing the write data corresponding to WLk in the first memory plane (e.g., memory plane 0) to storing the write data corresponding to WLk in the last memory plane (e.g., memory plane 3). In addition, there is a corresponding protection mode for RAID protection of write data, and the protection mode is usually recorded as nWL RAID protection mode. When n=1, the protection mode is called 1WL RAID protection mode. When n=2, the protection mode is called 2WL RAID protection mode.

The so-called nWL RAID protection mode means: when generating parity data, a plurality of selected word lines are grouped according to the number n to obtain a plurality of group of selected word lines, and the parity data of the write data corresponding to the selected word lines in the same group of selected word lines are independent of each other, while the parity data of the write data corresponding to the selected word lines in different group of selected word lines are related.

Based on this, in some examples, the plurality of selected word lines comprises N groups of selected word lines, each group of selected word lines comprises n selected word lines, n is greater than or equal to 1, and N is greater than 1. For example, the plurality of selected word lines is divided into N groups of selected word lines, each group of selected word lines comprises n selected word lines.

For example, for the memory die shown in FIG. 7, when n=1, each group of selected word lines comprises 1 selected word line. Wherein, WLk in memory plane 0 constitutes a group of selected word lines, WLk in memory plane 1 constitutes another group of selected word lines, WLk in memory plane 2 constitutes another group of selected word lines, and WLk in memory plane 3 constitutes another group of selected word lines. When n=2, each group of selected word lines comprises 2 selected word lines. Wherein, WLk in memory plane 0 and WLk in memory plane 1 constitute a group of selected word lines, and WLk in memory plane 2 and WLk in memory plane 3 constitute another group of selected word lines.

In the case where plurality of selected word lines comprises N groups of selected word lines, operation 1202 is implemented in way of example through the following operations.

Operation 1: The controller stores the write data corresponding to each group of selected word lines in the N groups of selected word lines sequentially; after the storing of the write data corresponding to the i-th group of selected word lines is complete, wherein i is greater than or equal to 1, and sends the temporary parity data for the write data corresponding to the i-th group of selected word lines through the second interface.

Operation 2: The host receives temporary parity data for the write data corresponding to the i-th group of selected word lines through the first interface, and stores the temporary parity data for the write data corresponding to the i-th group of selected word lines.

Wherein, when the controller stores the write data corresponding to each group of selected word lines in the N groups of selected word lines sequentially, it generates temporary parity data for the write data corresponding to each group of selected word lines sequentially, and then backs up the temporary parity data for the write data corresponding to each group of selected word lines to the host sequentially through the above operations 1 and 2.

For example, when i is equal to 1, the controller generates temporary parity data for the write data corresponding to the first group of selected word lines according to a certain strategy. When i is greater than 1, the controller obtains temporary parity data for the write data corresponding to the i−1th group of selected word lines backed up on the host through the second interface, and determines the temporary parity data for the write data corresponding to the i-th group of selected word lines based on the obtained temporary parity data.

In the example of the present application, the temporary parity data for the write data can be generated by a parity check. Based on this, when i=1, the write data corresponding to the first group of selected word lines can be directly used as the temporary parity data for the write data corresponding to the first group of selected word lines. When i is greater than 1, an XOR operation is performed between the write data corresponding to the i-th group of selected word lines and the temporary parity data for the write data corresponding to the previous (e.g., i−1) group of selected word lines, to obtain the temporary parity data for the write data corresponding to the i-th group of selected word lines.

In some examples, the example of the present application can also generate parity data by other means, which will not be described one by one here. The subsequent examples are explained by taking parity check as an example.

In addition, when i is greater than 1, the controller determines the temporary parity data for the write data corresponding to the i-th group of selected word lines based on the temporary parity data for the write data corresponding to the i−1th group of selected word lines. In some examples, the temporary parity data for the write data corresponding to the i-th group of selected word lines can also be determined based on the temporary parity data for the write data corresponding to the i−1th and i−2th group of selected word lines. In some examples, the temporary parity data for the write data corresponding to the i-th group of selected word lines can also be determined based on all the temporary parity data generated before the current time. The examples will not be described one by one here.

Operation 3: The controller is also configured to: determine the temporary parity data for the write data corresponding to the N-th group of selected word lines as the target parity data.

After the controller stores the write data corresponding to each group of selected word lines in the N groups of selected word lines sequentially, new temporary parity data is generated according to the temporary parity data for the write data corresponding to the group of selected word lines stored before the current time each time the write data corresponding to the group of selected word lines is stored. Therefore, when the write data corresponding to the Nth group of selected word lines (for example, the last group of selected word lines) is stored, the temporary parity data obtained last time is related to the write data corresponding to the N groups of selected word lines, for example, the temporary parity data obtained last time can indicate the association between the write data corresponding to the N groups of selected word lines, so the temporary parity data obtained last time can be used as the target parity data of the write data corresponding to the N groups of selected word lines (for example, the target write data).

After obtaining the target parity data for the target write data, the controller can store the target parity data in the memory. For example, for the memory system shown in FIG. 9, the controller swaps temporary parity data with the host in the process of storing the target write data in the memory, and stores the finally generated target parity data in the memory, so that the target write data can be verified when the target write data is read later.

In some examples, after obtaining the target parity data for the target write data, the controller may also store the target parity data in other memory devices, which will not be described one by one in this example.

In addition, when the controller stores data in the memory, it stores it in pages. Based on this, the write data corresponding to each group of selected word lines comprises a plurality of page data numbered according to the same rule.

For example, for the memory die shown in FIG. 7, each word line is coupled with 6 memory strings, each memory string comprises 3 pages, assuming that the current protection mode is 2WL RAID, for example, n=2, then the write data corresponding to each group of selected word lines comprises 2*6*3=36 page data, and the page numbers corresponding to the 36 page data corresponding to each group of selected word lines are page0 to page35.

In this scenario, in operation 1, the controller sequentially stores each page data of the plurality of page data corresponding to the i-th group of selected word lines, and after the storing of the j-th page data corresponding to the i-th group of selected word lines is complete, j is greater than or equal to 1, and sends the temporary parity data for the j-th page data corresponding to the i-th group of selected word lines through the second interface.

Accordingly, in operation 2, the host receives temporary parity data for the j-th page data corresponding to the i-th group of selected word lines through the first interface, and stores temporary parity data for the j-th page data corresponding to the i-th group of selected word lines.

Wherein, when i is equal to 1, the controller generates temporary parity data for each page data corresponding to the first group of selected word lines according to a certain strategy. When i is greater than 1, the controller obtains temporary parity data for the j-th page data corresponding to the i−1th group of selected word lines through the second interface, and determines the temporary parity data for the j-th page data in the i-th group of selected word lines based on the obtained temporary parity data. For example, when i is greater than 1, the temporary parity data for a certain page data in the current group of selected word lines is updated based on the temporary parity data for the page data with the same number in the previous group of selected word lines.

For example, in the scenario where parity data is generated by parity checking, when i=1, when storing each page data corresponding to the first group of selected word lines, each page data corresponding to the first group of selected word lines is used as temporary parity data for the corresponding page number. When i is greater than 1, when storing the j-th page data corresponding to the i-th group of selected word lines, the j-th page data corresponding to the i-th group of selected word lines and the temporary parity data for the j-th page data corresponding to the i−1th group of selected word lines are XORed to obtain the temporary parity data for the j-th page data corresponding to the i-th group of selected word lines.

In addition, based on the above introduction to the memory, it can be understood that the memory comprises at least one memory die, and each memory die of the at least one memory die comprises a plurality of memory planes.

In this scenario, the first buffer on the host may comprise at least one first region, and at least one first region corresponds to a memory die respectively, so as to store temporary parity data related to the corresponding memory die in different first regions. Wherein, the temporary parity data related to the corresponding memory die can be understood as: temporary parity data generated when writing data to the memory die.

Further, in the scenario where write data corresponding to each group of selected word lines comprises a plurality of page data numbered according to the same rule, in order to facilitate the storing of temporary parity data for different page data, each first region comprises a plurality of first sub-regions, and the plurality of first sub-regions correspond to a page number respectively.

FIG. 10 is a schematic diagram of the configuration of a first buffer on a host provided by an example of the present application. In FIG. 10, the first buffer comprises M first regions, such as the first region 0 to the first region M−1, and each first region comprises L first sub-regions, such as the first sub-region 0 to the first sub-region L−1.

For example, for the memory die shown in FIG. 7, assuming that the current protection mode is 2WL RAID, for example, n=2, the write data corresponding to each group of selected word lines comprises 2*6*3=36 pages of data, and the 36 pages of data corresponding to each group of selected word lines can be marked as page0 to page35 sequentially.

Correspondingly, each first region comprises 36 first sub-regions, for example, L=36, and the page numbers corresponding to these 36 first sub-regions are page0 to page35, respectively, where first sub-region 0 corresponds to page0, the first sub-region 1 corresponds to page1, . . . the second sub-region L−1 corresponds to page35. The total capacity of the first region=36*16 kKB=576 KB.

Based on this, the host stores temporary parity data for the j-th page data corresponding to the i-th group of selected word lines, and the implementation method can be: when the temporary parity data for the j-th page data corresponding to the i-th group of selected word lines is received through the first interface, the first sub-region is selected from the first region corresponding to the target memory die based on the page number corresponding to the j-th page data, and the target memory die is the memory die to store the target write data; the received temporary parity data is stored in the selected first sub-region in way of overwriting.

Wherein, overwriting means: when data is stored in the selected first sub-region, the data is deleted (or cleared) and the received temporary parity data is stored.

In addition, in the scenario where memory comprises at least one memory die, in order to facilitate the controller to buffer temporary parity data, the second buffer on the controller comprises at least one second region, and the at least one second region corresponds to a memory die respectively, so as to store temporary parity data related to the corresponding memory die in different second regions. Wherein, the temporary parity data related to the corresponding memory die can be understood as: temporary parity data generated when storing write data to the memory die.

Furthermore, since the temporary parity data can be subsequently backed up to the first buffer of the host, each second region comprises a plurality of second sub-regions, each second sub-region is to store temporary parity data for a page of data, and the total number of second sub-regions in each second region is less than the total number of page data corresponding to a group of selected word lines. This can reduce the amount of temporary parity data stored on the controller, thereby improving the performance of the controller.

Figure 13:
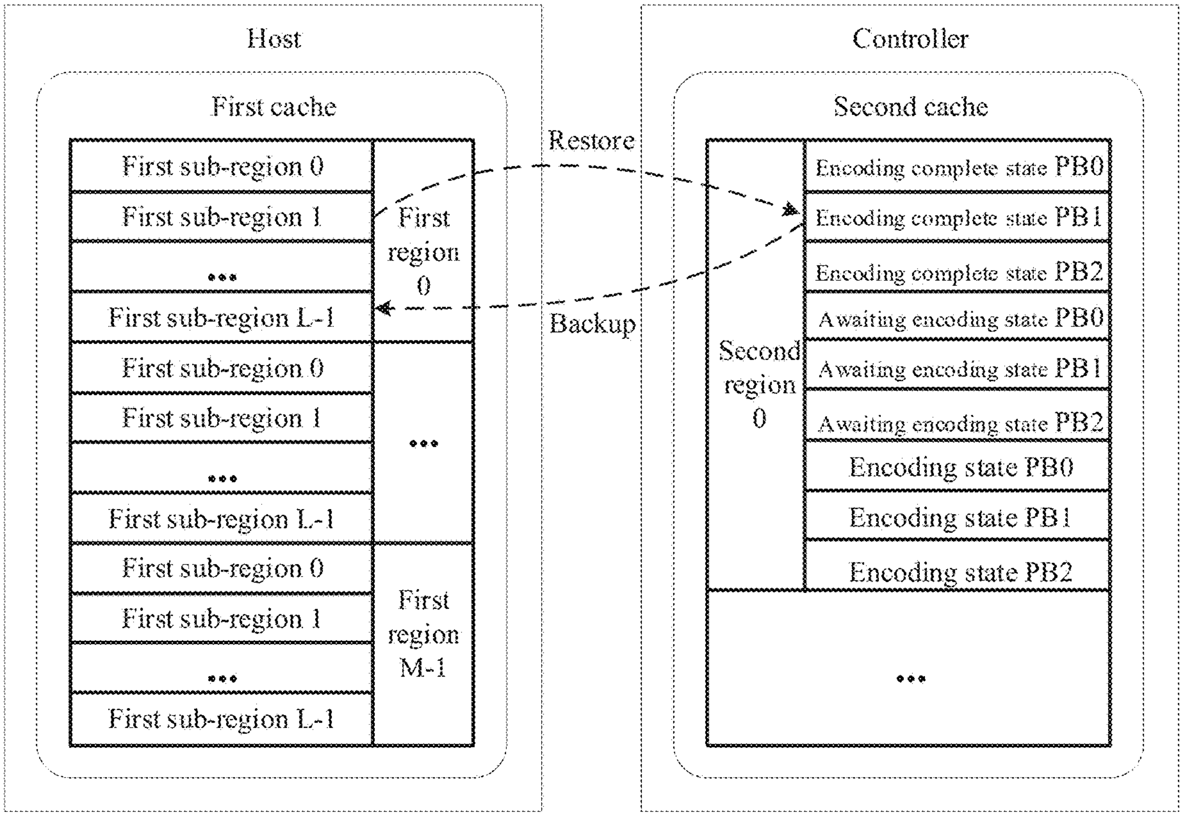
FIG. 13 is a schematic diagram of a first buffer and a second buffer provided by an example of the present application.

As shown in FIG. 13, assuming that the memory comprises M memory dies, the second buffer comprises M second regions such as the second region 0, each second region comprises 9 second sub-regions, each second sub-region is to buffer temporary parity data for a page of data, and the temporary parity data for one page of data can be called a parity data strip (parity entries). The total capacity of the second region=9*16 kKB=144 KB.

Since the total number of second sub-regions in the second region is less than the total number of page data corresponding to a group of selected word lines, when the controller stores temporary parity data for page data corresponding to a group of selected word lines, before all the page data corresponding to the group of selected word lines are stored, there is a need to back up the temporary parity data in the second region to the host.

In some examples, the controller may back up the temporary parity data in the second region to the host in the following manner: before storing the j-th page data corresponding to the i-th group of selected word lines, when there is no idle second sub-region in the second region corresponding to the target memory die, select a second sub-region in the encoding complete state from the second region corresponding to the target memory die, and send the temporary parity data in the selected second sub-region through the second interface, where target memory die is the memory die to store the target write data; obtain the temporary parity data for the j-th page data corresponding to the i−1th group of selected word lines from the host through the second interface, store the obtained temporary parity data in the selected second sub-region in an overwriting writing manner, and update the state of the selected second sub-region to the awaiting encoding state; in the process of storing the j-th page data, store the temporary parity data for the j-th page data in the selected second sub-region in an overwriting writing manner; after the j-th page data is stored, update the state of the selected second sub-region to the encoding complete state.

Wherein, the second sub-region in the second region corresponding to the target memory die that has no idle second sub-region can be understood as: temporary parity data is stored in each second sub-region in the second region.

In the example of the present application, when there is no idle second sub-region in the second region corresponding to the target memory die, the temporary parity data in which second sub-regions are backed up to the host can be selected according to whether the state of each second sub-region in the second region is the encoding complete state.

Accordingly, when there is an idle second sub-region in the second region corresponding to the target memory die, it indicates that the current state is in the early stage of storing the write data corresponding to the first group of selected word lines, and the idle second sub-region can be selected to store the currently generated temporary parity data.

In addition, the state of the second sub-region comprises the above-mentioned encoding complete state and awaiting encoding state, and can also comprise the encoding state. In this scenario, after the controller obtains the temporary parity data for the j-th page data corresponding to the i−1th group of selected word lines from the host through the second interface, and stores the obtained temporary parity data in the selected second sub-region in way of overwriting writing, the state of the selected second sub-region is updated to the awaiting encoding state. When the j-th page data corresponding to the i-th group of selected word lines starts to be stored, the state of the selected second sub-region is updated to the encoding state. After the j-th page data is stored, the status of the selected second sub-region is updated to the encoding complete state.

In the scenario where second sub-region corresponds to the awaiting encoding state, the encoding state, and the encoding complete state, when the storage unit in the memory is TLC, considering that the controller writes 3 pages of data in parallel each time, each second region can comprise 3*3=9 second sub-regions. Therefore, FIG. 10 takes the storage unit in the memory as TLC as an example.

As shown in FIG. 10, in the process of the controller writing data to the memory device target, three of the 9 second sub-regions in the second region are in the encoding complete state, which are marked as encoding complete state PB0, encoding complete state PB1, and encoding complete state PB2 in FIG. 10; three second sub-regions are in the awaiting encoding state, which are marked as awaiting encoding state PB0, awaiting encoding state PB1, and awaiting encoding state PB2 in FIG. 10; and three second sub-regions are in the encoding state, which are marked as encoding state PB0, encoding state PB1, and encoding state PB2 in FIG. 10.

In some examples, when the storage unit in the memory is MLC, each second sub-region can comprise 2*3=6 second sub-regions. When the storage unit in the memory is a QLC (quad-level cells), each second sub-region may comprise 4*3=12 second sub-regions.

In some examples, each second region may comprise a larger number of second sub-regions, which is not limited in the example of the present application.

As shown in FIG. 13, assuming that the second region corresponding to the target memory die is the second region 0, before storing a certain page data to the target memory die, the controller first selects the second sub-region in the second region 0 with the encoding complete state, and backs up the temporary parity data in the selected second sub-region to the host, and deletes the temporary parity data in the selected second sub-region, and then restores the temporary parity data in the first sub-region with the same page number as the page number of the page data in the first region 0 to the selected second sub-region, and updates the state of the selected second sub-region to the awaiting encoding state.

Figure 14:
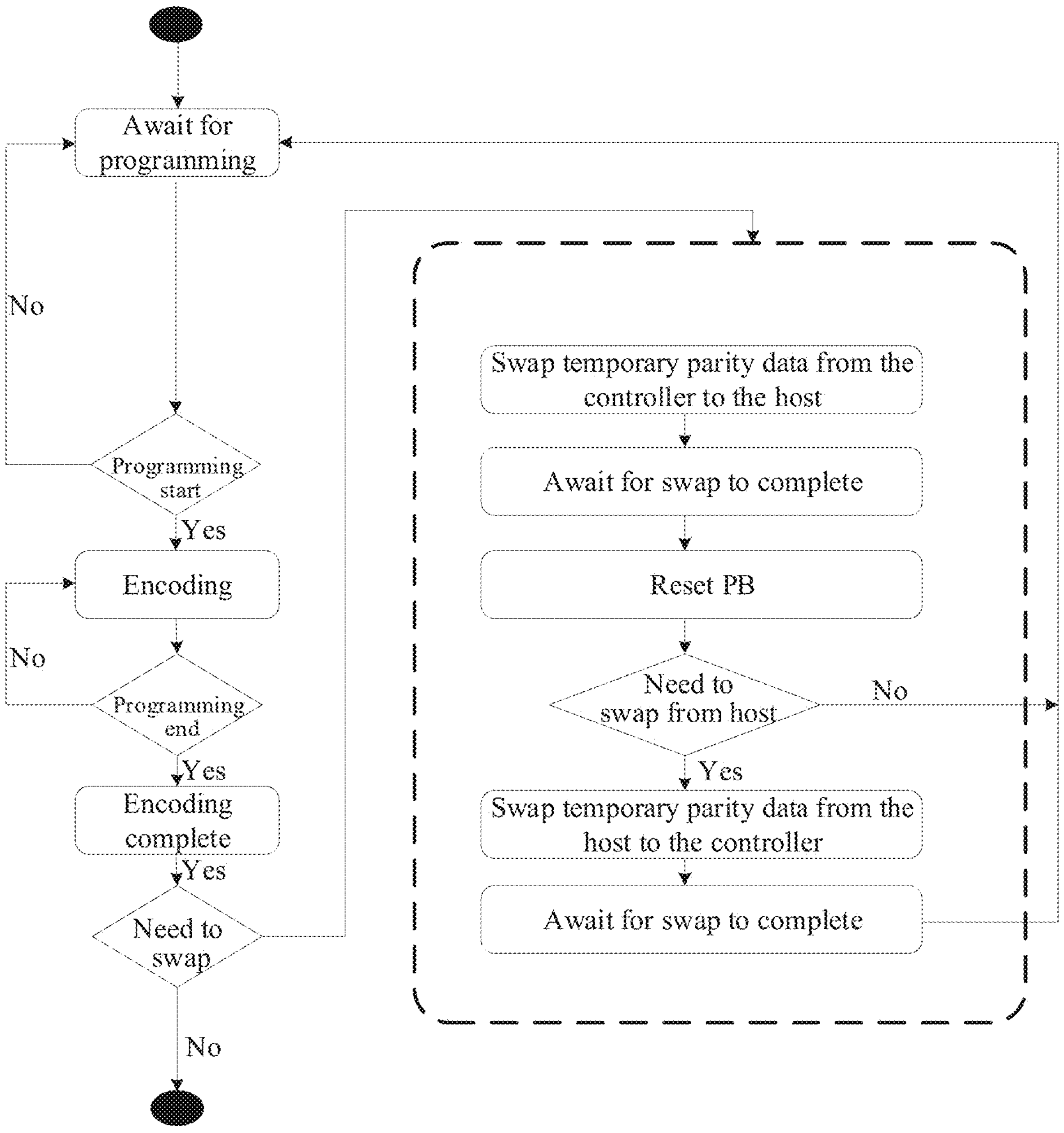
FIG. 14 is a schematic diagram of a process for storing temporary parity data by a controller provided by an example of the present application.

FIG. 14 is a flow diagram of a controller storing temporary parity data provided by an example of the present application. As shown in FIG. 14, after updating the state of the selected second sub-region to the awaiting encoding state, the controller waits for the controller to store the page data to the memory, for example, waits for programming, and determines whether programming has started. When programming starts, the state of the selected second sub-region is updated to the encoding state, and then it is determined whether programming is complete. When programming is complete, the state of the selected second sub-region is updated to the encoding complete state.

Afterwards, when the controller determines that temporary parity data needs to be swapped, such as when the next page number needs to be stored, the temporary parity data is swapped in the manner shown in FIG. 13. In some examples, the temporary parity data in the currently selected second sub-region is first swapped from the controller to the host, and after the swap is complete, the data in the selected second sub-region is cleared (for example, PB is reset). Then, when it is determined that temporary parity data needs to be swapped from the host to the controller, temporary parity data is swapped from the host to the controller.

In addition, in an example of the present application, the first buffer in the host and the second buffer in the controller can be pre-configured.

In some examples, the implementation method of configuring the first buffer in the host can be: the controller obtains the configuration information of the memory; determines the first buffer configuration information based on the configuration information of the memory, and sends the first buffer configuration information to the host through the second interface; the host receives the first buffer configuration information through the first interface, configures the first buffer based on the first buffer configuration information, and the first buffer is to store the temporary parity data received through the first interface.

Wherein, the configuration information of the memory obtained when configuring the first buffer in the host exemplarily comprises information of the memory die in the memory, the number of memory strings coupled to each word line in each memory die, the type of storage unit in the memory, the RAID protection mode of the memory, etc.

For example, the number of first regions in the first buffer is configured according to the number of memory dies in the memory, and each first region corresponds to a memory die. The number of first sub-regions in each first region is configured according to the number of memory strings coupled to each word line, the type of storage unit in the memory, and the RAID protection mode of the memory.

Wherein, the detailed implementation method of determining the first buffer configuration information based on the configuration information of the memory can refer to the relevant content of FIG. 13, which will not be repeated here.

In some examples, the implementation method of configuring the second buffer in the controller can be: obtaining the configuration information of the memory; determining the second buffer configuration information based on the configuration information of the memory; configuring the second buffer based on the second buffer configuration information, and the second buffer is to store the temporary parity data received by the controller through the second interface and the temporary parity data currently generated by the controller.

Wherein, the configuration information of the memory obtained when configuring the second buffer in the controller exemplarily comprises information of the memory die in the memory, the type of storage unit in the memory, etc.

For example, the number of second regions in the second buffer is configured according to the number of memory dies in the memory, and each second region corresponds to a memory die. The number of second sub-regions in each second region is configured according to the type of storage unit in the memory.

Wherein, the detailed implementation method of determining the first buffer configuration information based on the configuration information of the memory can refer to the relevant content of FIG. 13, which will not be repeated here.

Figure 15:
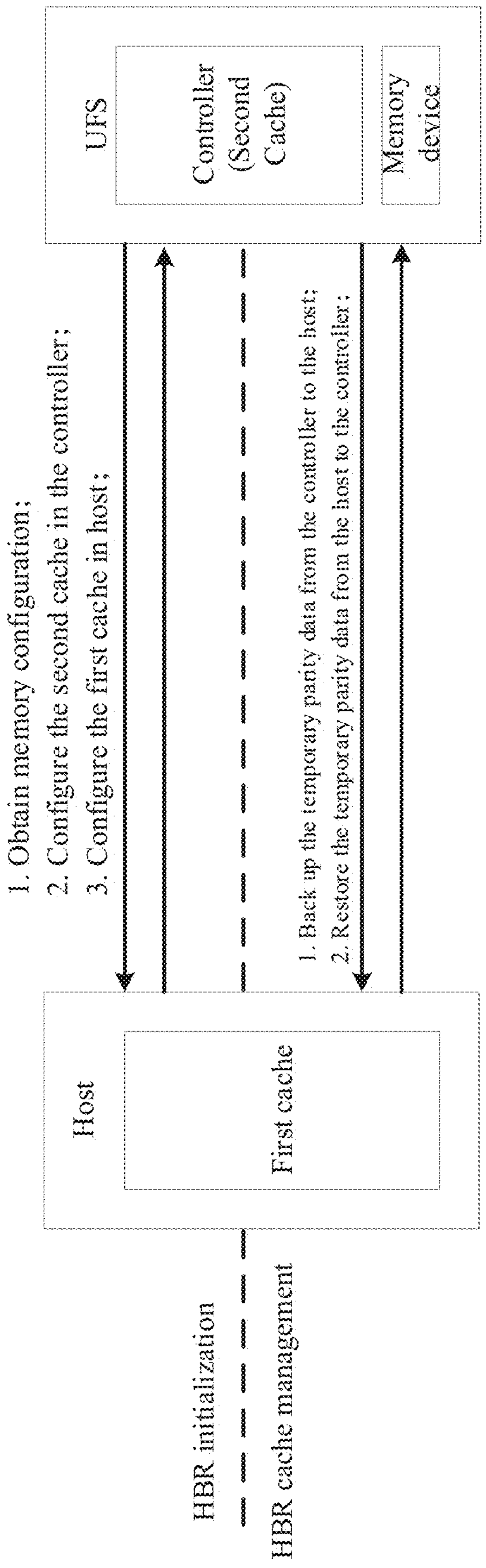
FIG. 15 is a schematic diagram of a framework of an HBR technology provided by an example of the present application.

In addition, the scheme for the controller and the host to swap temporary parity data provided in the example of the present application can be called HBR (host boost RAID, host assisted RAID) technology. FIG. 15 is a schematic diagram of the framework of an HBR technology provided in the example of the present application. As shown in FIG. 15, the HBR technology comprises two parts, namely HBR initialization and HBR buffer management.

Wherein, HBR initialization is to configure the first buffer on the host and the second buffer on the controller. For example, the controller in the UFS obtains the configuration information of the memory, configures the second buffer on the controller based on the configuration information of the memory, and configures the first buffer on the host based on the configuration information of the memory.

HBR buffer management is to swap temporary parity data between the host and the controller. For example, the temporary parity data is backed up from the controller to the host, and the temporary parity data is restored from the host to the controller.

Figure 16:
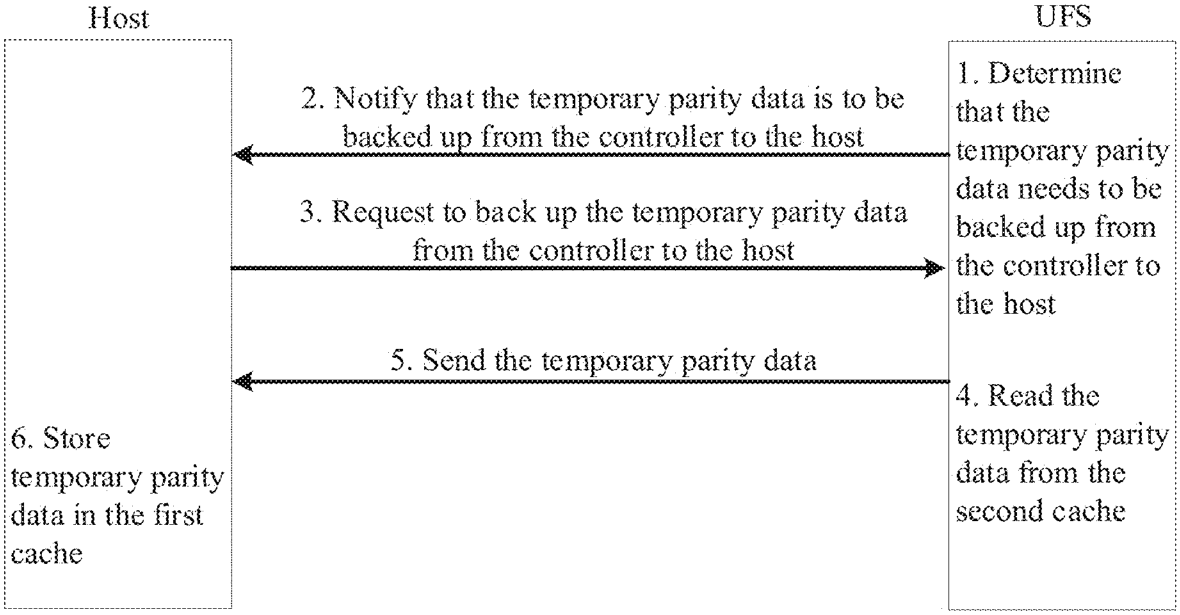
FIG. 16 is a schematic diagram of a process for backing up temporary parity data from a controller to a host provided by an example of the present application.

FIG. 16 is a flow chart of backing up temporary parity data from a controller to a host provided by an example of the present application. As shown in FIG. 16, when the controller in the UFS determines that the temporary parity data corresponding to a page number needs to be backed up from the controller to the host, the controller sends a notification message to the host, and the notification message is to notify the temporary parity data corresponding to the page number to be backed up from the controller to the host, and the notification message can be marked as "RESPONSE UPIU notify "Read Parity Region"". The host receives the notification message and returns a request message to the controller based on the notification message, and the request message is to request that the temporary parity data corresponding to the page number be backed up from the controller to the host, and the request message can be marked as "READ BUFFER command request to "Read Parity Region"". After receiving the request message, the controller reads the temporary parity data corresponding to the page number from the second buffer, and sends the temporary parity data to the host, wherein the sent temporary parity data can be marked as "DATA IN UPIU HBR Regions delivery". The host receives the temporary parity data and stores the temporary parity data in the first sub-region corresponding to the page number, for example, in the first buffer.

Figure 17:
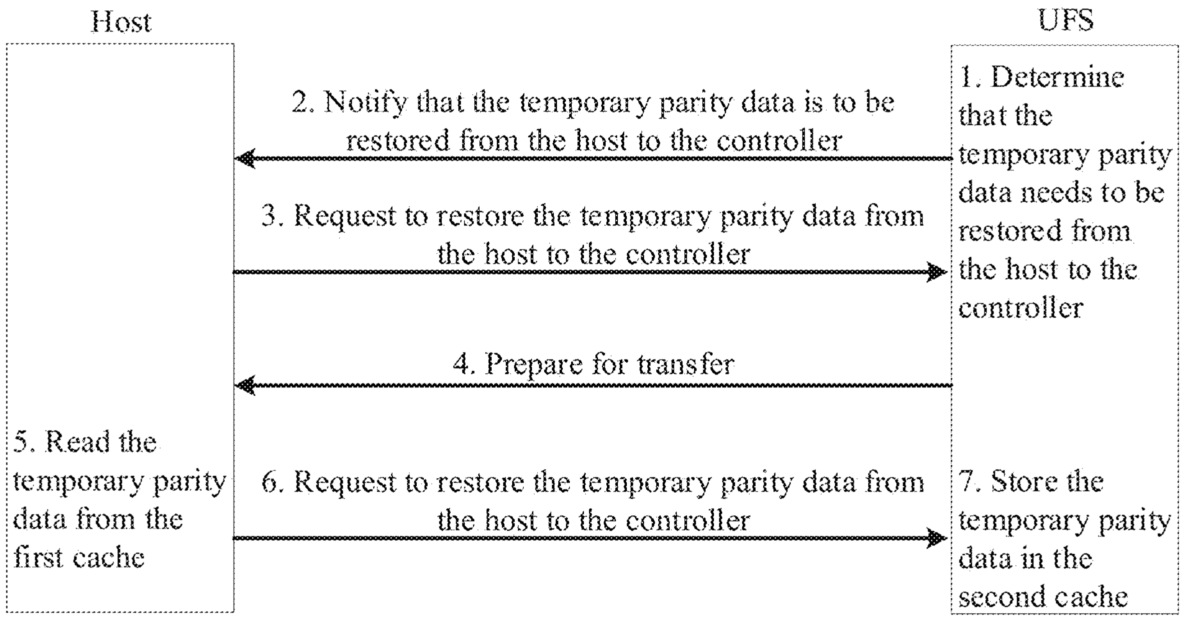
FIG. 17 is a schematic diagram of a process for restoring temporary parity data from a host to a controller provided by an example of the present application.

FIG. 17 is a flow chart of restoring temporary parity data from a host to a controller provided by an example of the present application. As shown in FIG. 17, when the controller in the UFS determines that the temporary parity data corresponding to a page number needs to be restored from the host to the controller, the controller sends a notification message to the host, and the notification message is to notify the temporary parity data corresponding to the page number to be restored from the host to the controller, and the notification message can be marked as "RESPONSE UPIU notify "Write Parity Region"". The host receives the notification message, and returns a request message to the controller based on the notification message, and the request message is to request that the temporary parity data corresponding to the page number be restored from the host to the controller, and the request message can be marked as "WRITE BUFFER command request to "Write Parity Region"". After receiving the request message, the controller returns a ready to transfer message to the host, and the ready to transfer response message can be marked as "READY TO TRANSFER UPIU". The host receives the ready to transfer message, reads the temporary parity data corresponding to the page number from the first buffer, and sends the temporary parity data to the controller, wherein the sent temporary parity data can be marked as "DATA OUT UPIU HBR Regions delivery". The controller receives the temporary parity data and stores the temporary parity data in the second buffer.

It should be noted that FIG. 16 and FIG. 17 are example schematic diagrams of the interaction between the host and the controller in the example of the present application, and do not constitute a limitation on the example of the present application. In the example of the present application, when the host and the controller swap temporary parity data, the temporary parity data can also be swapped through other means, which will not be illustrated one by one here.

In addition, it should be noted that in the scheme for swapping temporary parity data between the host and the controller provided in the example of the present application, the bandwidth between the host and the controller needs to meet the demand for swapping temporary parity data between the host and the controller. In the host write scenario, since the rate of transmitting write data between the host and the controller is low, there is more redundant bandwidth for swapping temporary parity data. In the garbage collection scenario, no write data is transmitted between the host and the controller, so there is enough bandwidth for swapping temporary parity data.

In summary, in the example of the present application, a first interface is configured on the host and a second interface is configured on the controller. When the controller writes data to the memory, the controller swaps temporary parity data with the host through the second interface and the first interface. Compared with swapping temporary parity data between the controller and the memory, on the one hand, the memory overhead can be reduced, thereby improving the OP of the memory; on the other hand, the IO bandwidth between the controller and the memory can be saved, thereby improving the performance of the controller and the memory; on the other hand, the controller's demand for buffer space such as SRAM can be reduced, and the cost of SRAM on the controller can be reduced accordingly; on the other hand, RAID protection can be performed not only on the written data in the host write scenario, but also on the written data in the garbage collection scenario.

Figure 18:
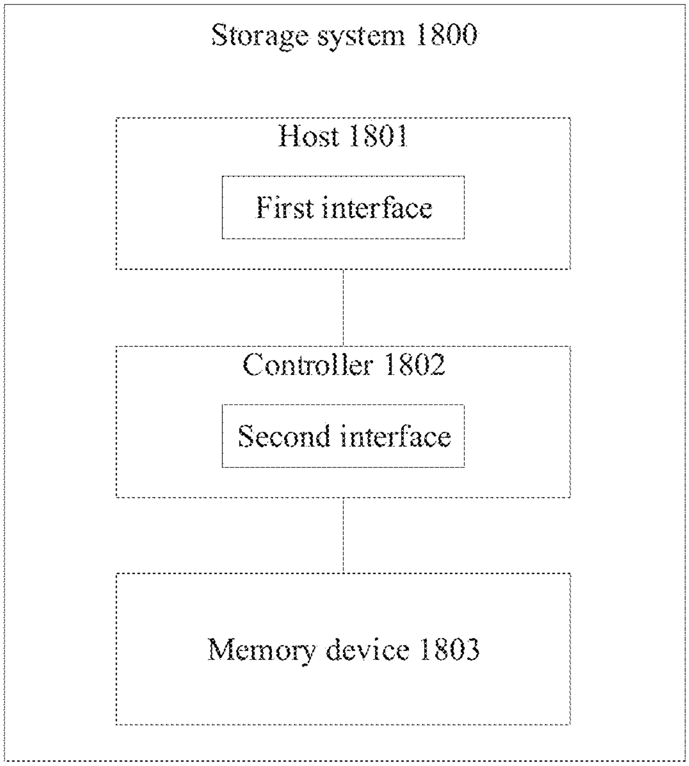
FIG. 18 is a schematic diagram of the architecture of another memory system provided by an example of the present application.

Based on the operation method of the memory system shown in FIG. 12, the example of the present application also provides a memory system. FIG. 18 is an architectural schematic diagram of another memory system provided in the example of the present application. As shown in FIG. 18, the memory system 1800 comprises a host 1801, a controller 1802, and a memory 1803. The host comprises a first interface, the controller comprises a second interface, and the memory comprises a plurality of memory planes. Each memory plane of the plurality of memory planes comprises a plurality of word lines numbered according to the same rule, and each word line of the plurality of word lines is coupled to a plurality of memory strings. The controller is configured to: obtain target write data, the target write data comprises write data corresponding to a plurality of selected word lines, and the plurality of selected word lines comprise word lines with target word line numbers in a plurality of memory planes; in the process of storing the target write data in the memory strings coupled to the plurality of selected word lines respectively, swap temporary parity data with the host through the second interface and the first interface to determine the target parity data for the target write data, and the temporary parity data is the parity data generated in the process of determining the target parity data. In some examples, the host also comprises a first buffer, and the controller also comprises a second buffer, the first buffer is to store temporary parity data received by the host through the first interface, and the second buffer is to store temporary parity data received by the controller through the second interface and the currently generated temporary parity data, and the capacity of the first buffer is greater than the capacity of the second buffer. In some examples, the plurality of selected word lines comprises N groups of selected word lines, each group of selected word lines comprises n selected word lines, where n is greater than or equal to 1, and N is greater than 1;

The controller is configured to: store the write data corresponding to each group of selected word lines in the N groups of selected word lines sequentially; after the storing of the write data corresponding to the i-th group of selected word lines is completed, i is greater than or equal to 1, and send the temporary parity data for the write data corresponding to the i-th group of selected word lines through the second interface;

The host is configured to: receive the temporary parity data for the write data corresponding to the i-th group of selected word lines through the first interface, and store the temporary parity data for the write data corresponding to the i-th group of selected word lines;

The controller is also configured to: determine the temporary parity data for the write data corresponding to the N-th group of selected word lines as the target parity data.

In some examples, i is greater than 1;

The controller is configured to: obtain the temporary parity data for the write data corresponding to the i−1-th group of selected word lines backed up on the host through the second interface, and determine the temporary parity data for the write data corresponding to the i-th group of selected word lines based on the obtained temporary parity data.

In some examples, the write data corresponding to each group of selected word lines comprises a plurality of page data numbered according to the same rule;

The controller is configured to: store each page data of the plurality of page data corresponding to the i-th group of selected word lines sequentially, and after the storing of the j-th page data corresponding to the i-th group of selected word lines is complete, j is greater than or equal to 1, and send the temporary parity data for the j-th page data corresponding to the i-th group of selected word lines through the second interface;

The host is configured to: receive the temporary parity data for the j-th page data corresponding to the i-th group of selected word lines through the first interface, and store the temporary parity data for the j-th page data corresponding to the i-th group of selected word lines.

In some examples, i is greater than 1;

The controller is also configured to: obtain the temporary parity data for the j-th page data corresponding to the i−1-th group of selected word lines through the second interface, and determine the temporary parity data for the j-th page data in the i-th group of selected word lines based on the obtained temporary parity data.

In some examples, the memory comprises at least one memory die, each of which comprises a plurality of memory planes;

The host also comprises a first buffer, the first buffer comprises at least one first region, at least one first region corresponds to a memory die, and each first region comprises a plurality of first sub-regions, each of which corresponds to a page number.

In some examples, the host is configured to:

When receiving temporary parity data for the j-th page data corresponding to the i-th group of selected word lines through the first interface, select a first sub-region from the first region corresponding to the target memory die based on the page number corresponding to the j-th page data, the target memory die is a memory die to store the target write data;

Store the received temporary parity data in the selected first sub-region in way of overwriting.

In some examples, the memory comprises at least one memory die, each of which comprises a plurality of memory planes;

The controller also comprises a second buffer, the second buffer comprises at least one second region, at least one second region corresponds to a memory die, each second region comprises a plurality of second sub-regions, and the total number of second sub-regions in each second region is less than the total number of page data corresponding to a group of selected word lines.

In some examples, the controller is further configured to:

Before storing the j-th page data corresponding to the i-th group of selected word lines, in case of no second sub-region in the idle state existing in the second region corresponding to the target memory die, select a second sub-region in the encoding complete state from the second region corresponding to the target memory die, send temporary parity data in the selected second sub-region through the second interface, and the target memory die is the memory die to store the target write data;

Obtain the temporary parity data for the j-th page data corresponding to the i−1th group of selected word lines from the host through the second interface, store the obtained temporary parity data in the selected second sub-region in way of overwriting, and update the state of the selected second sub-region to the awaiting encoding state;

In the process of storing the j-th page data, store the temporary parity data for the j-th page data in the selected second sub-region in way of overwriting;

After the j-th page data storage is complete, update the state of the selected second sub-region to the encoding complete state.

In some examples, the controller is further configured to: obtain the configuration information of the memory; determine the first buffer configuration information based on the configuration information of the memory, and send the first buffer configuration information to the host through the second interface;

The host is configured to: receive the first buffer configuration information through the first interface, configure the first buffer based on the first buffer configuration information, and the first buffer is to store temporary parity data received through the first interface.

In some examples, the controller is further configured to:

obtain the configuration information of the memory;

determine the second buffer configuration information based on the configuration information of the memory;

configure the second buffer based on the second buffer configuration information, and the second buffer is to store the temporary parity data received by the controller through the second interface and the temporary parity data currently generated by the controller.

The technical effect of the memory system shown in FIG. 18 can refer to the example shown in FIG. 12, which will not be repeated here.

In addition, the example of the present application also provides a controller, which is coupled to a host and a memory respectively, the controller comprises a second interface, the memory comprises a plurality of memory planes, each memory plane of the plurality of memory planes comprises a plurality of word lines numbered according to the same rule, and each word line of the plurality of word lines is coupled to a plurality of memory strings;

The controller is configured to:

Obtain target write data, the target write data comprises write data corresponding to a plurality of selected word lines respectively, and the plurality of selected word lines comprise word lines with target word line numbers in a plurality of memory planes;

In the process of storing the target write data in the memory strings respectively coupled to the plurality of selected word lines, send temporary parity data to the host through the second interface, and receive temporary parity data sent from the host through the second interface to determine the target parity data for the target write data, and the temporary parity data is the parity data generated in the process of determining the target parity data.

In some examples, the plurality of selected word lines comprises N groups of selected word lines, each group of selected word lines comprises n selected word lines, where n is greater than or equal to 1, and N is greater than 1;

The controller is configured to:

sore the write data corresponding to each group of selected word lines in the N groups of selected word lines sequentially;

after the storing of the write data corresponding to the i-th group of selected word lines is complete, i is greater than or equal to 1, send the temporary parity data for the write data corresponding to the i-th group of selected word lines through the second interface;

Determine the temporary parity data for the write data corresponding to the N-th group of selected word lines as the target parity data.

In some examples, i is greater than 1;

The controller is configured to: obtain temporary parity data for the write data corresponding to the i−1th group of selected word lines backed up on the host through the second interface, and determine the temporary parity data for the write data corresponding to the i-th group of selected word lines based on the obtained temporary parity data;

In some examples, the memory comprises at least one memory die, and each memory die of at least one memory die comprises a plurality of memory planes;

The write data corresponding to each group of selected word lines comprises a plurality of page data numbered according to the same rule;

The controller also comprises a second buffer, the second buffer comprises at least one second region, at least one second region corresponds to a memory die respectively, each second region comprises a plurality of second sub-regions, and the total number of second sub-regions in each second region is less than the total number of page data corresponding to a group of selected word lines, and each second sub-region is to store temporary parity data for a page data.

In some examples, the controller is also configured to:

Obtain configuration information of the memory;

Determine the second buffer configuration information based on the configuration information of the memory;

configure the second buffer based on the second buffer configuration information;

wherein, the second buffer is to store the temporary parity data received by the controller through the second interface and the currently generated temporary parity data.

In some examples, the controller is also configured to:

obtain the configuration information of the memory;

determine the first buffer configuration information based on the configuration information of the memory; and send the first buffer configuration information to the host through the second interface.

The technical effect of the above controller can refer to the example shown in FIG. 12, which will not be repeated here.

In addition, the example of the present application also provides a host, the host is coupled to the controller, the controller is coupled to the memory, the host comprises a first interface, the memory comprises a plurality of memory planes, each memory plane of the plurality of memory planes comprises a plurality of word lines numbered according to the same rule, and each word line of the plurality of word lines is coupled to a plurality of memory strings;

The host is configured to: receive temporary parity data sent by the controller through the first interface, store the received temporary parity data, and send the stored temporary parity data to the controller through the first interface;

Wherein, the temporary parity data is parity data generated by the controller in the process of determining the target parity data for the target write data, the target write data comprises write data corresponding to a plurality of selected word lines respectively, and the plurality of selected word lines comprise word lines with target word line numbers in a plurality of memory planes.

In some examples, the plurality of selected word lines comprises N groups of selected word lines, each group of selected word lines comprises n selected word lines, where n is greater than or equal to 1, and N is greater than 1;

The host is configured to: receive temporary parity data for the write data corresponding to the i-th group of selected word lines through the first interface, wherein i is greater than or equal to 1, and store the temporary parity data for the write data corresponding to the i-th group of selected word lines.

In some examples, the memory comprises at least one memory die, and each memory die of at least one memory die comprises a plurality of memory planes;

The write data corresponding to each group of selected word lines comprises a plurality of page data numbered according to the same rule;

The host also comprises a first buffer, the first buffer comprises at least one first region, at least one first region corresponds to a memory die, and each first region comprises a plurality of first sub-regions, and the plurality of first sub-regions correspond to a page number.

In some examples, the host is configured to:

When receiving temporary parity data for the j-th page data corresponding to the i-th group of selected word lines through the first interface, select the first sub-region from the first region corresponding to the target memory die based on the page number corresponding to the j-th page data, and the target memory die is the memory die to store the target write data;

Store the received temporary parity data in the selected first sub-region in way of overwriting.

In some examples, the host is configured to:

Receive the first buffer configuration information through the first interface;

Configure the first buffer based on the first buffer configuration information, and the first buffer is to store the received temporary parity data.

The technical effect of the above host can refer to the example shown in FIG. 12, which will not be repeated here.

The skills in the art can understand that all or part of the operations of implementing the above example can be complete by hardware, or can be complete by instructing the relevant hardware through a program, and the program can be stored in a computer-readable storage medium, and the above-mentioned storage medium can be a read-only memory, a disk or an optical disk, etc.

The above description is only a preferred example of the present application and is not intended to limit the present application. Any modifications, equivalent substitutions, improvements, etc. made within the spirit and principles of the examples of the present application should be included in the protection scope of the examples of the present application.

What is claimed is:

1. A memory system, comprising: a host comprising a first interface; a memory comprising a plurality of memory planes, each of which comprises a plurality of word lines numbered according to a same rule, and each word line of the plurality of word lines is coupled to a plurality of memory strings; and a controller comprising a second interface coupled to the first interface and configured to: obtain target write data, wherein the target write data comprises write data corresponding respectively to a plurality of selected word lines, the plurality of selected word lines comprising word lines of the plurality of word lines with target word line numbers in the plurality of memory planes; and in a process of storing the target write data in the memory strings coupled to the plurality of selected word lines, send currently generated temporary parity data to the host through the second interface and the first interface, and receive previously backed-up temporary parity data from the host through the first interface and the second interface, to determine target parity data for the target write data, wherein the currently generated temporary parity data is parity data currently generated by the controller in the process of determining the target parity data, and the previously backed-up temporary parity data is temporary parity data previously generated by the controller in the process of determining the target parity data and previously stored at the host.

2. The memory system of claim 1, wherein the host further comprises a first buffer, and the controller further comprises a second buffer, wherein the first buffer stores currently generated temporary parity data sent from the controller and received by the host through the first interface, the second buffer stores previously backed-up temporary parity data received by the controller through the second interface from the host and currently generated temporary parity data generated by the controller, and wherein a capacity of the first buffer is greater than that of the second buffer.

3. The memory system of claim 1, wherein the plurality of selected word lines comprises N groups of selected word lines, each group of selected word lines comprising n selected word lines, n is greater than or equal to 1, and N is greater than 1; the controller is configured to: store target write data corresponding to each group of selected word lines in the N groups of selected word lines sequentially; and after storing of the target write data corresponding to an i-th group of selected word lines is complete, i is greater than or equal to 1, send the currently generated temporary parity data for the target write data corresponding to the i-th group of selected word lines through the second interface; and the host is configured to: receive the currently generated temporary parity data for the target write data corresponding to the i-th group of selected word lines through the first interface, and store the currently generated temporary parity data for the target write data corresponding to the i-th group of selected word lines; and the controller is further configured to: determine the currently generated temporary parity data for the target write data corresponding to an N-th group of selected word lines as the target parity data.

4. The memory system of claim 3, wherein i is greater than 1, and the controller is configured to: obtain previously backed-up temporary parity data for the target write data corresponding to an i−1th group of selected word lines backed up on the host through the second interface, and determine the currently generated temporary parity data for the target write data corresponding to the i-th group of selected word lines based on the obtained previously backed-up temporary parity data.

5. The memory system of claim 3, wherein the target write data corresponding to each group of selected word lines comprises a plurality of page data numbered according to the same rule, the controller is configured to: store each page data of the plurality of page data corresponding to the i-th group of selected word lines sequentially, and after the storing of a j-th page data corresponding to the i-th group of selected word lines is complete, where j is greater than or equal to 1, send the currently generated temporary parity data for the j-th page data corresponding to the i-th group of selected word lines through the second interface, and the host is configured to: receive the currently generated temporary parity data for the j-th page data corresponding to the i-th group of selected word lines through the first interface, and store the currently generated temporary parity data for the j-th page data corresponding to the i-th group of selected word lines.

6. The memory system of claim 5, wherein the i is greater than 1, and the controller is further configured to: obtain previously backed-up temporary parity data for the j-th page data corresponding to an i−1th group of selected word lines through the second interface, and determine the currently generated temporary parity data for the j-th page data in the i-th group of selected word lines based on the obtained previously backed-up temporary parity data.

7. The memory system of claim 5, wherein the memory comprises at least one memory die, each memory die of the at least one memory die comprises the plurality of memory planes, and the host further comprises a first buffer, the first buffer comprises at least one first region, the at least one first region corresponds to one memory die respectively, and each first region comprises a plurality of first sub-regions, the plurality of first sub-regions correspond to one page number respectively.

8. The memory system of claim 7, wherein the host is configured to:

when receiving the currently generated temporary parity data for the j-th page data corresponding to the i-th group of selected word lines through the first interface, obtain a selected first sub-region from the first region corresponding to a target memory die based on the page number corresponding to the j-th page data, wherein the target memory die is a memory die to store the target write data; and store the received currently generated temporary parity data in the selected first sub-region in way of overwriting.

9. The memory system of claim 5, wherein the memory comprises at least one memory die, each memory die of the at least one memory die comprises the plurality of memory planes, and the controller further comprises a second buffer, the second buffer comprises at least one second region, the at least one second region corresponds to one memory die respectively, each second region comprises a plurality of second sub-regions, and a total number of second sub-regions in each second region is less than the total number of page data corresponding to one group of selected word lines.

10. The memory system of claim 9, wherein the controller is further configured to:

before storing the j-th page data corresponding to the i-th group of selected word lines, in case of no second sub-region in an idle state existing in the second region corresponding to a target memory die, select one second sub-region with a state being an encoding complete state from the second region corresponding to the target memory die, send currently generated temporary parity data in the selected second sub-region through the second interface, wherein the target memory die is a memory die to store the target write data;

obtain the previously backed-up temporary parity data for the j-th page data corresponding to an i−1th group of selected word lines from the host through the second interface, and store the obtained previously backed-up temporary parity data in the selected second sub-region in way of overwriting, and update the state of the selected second sub-region to an awaiting encoding state;

in the process of storing the j-th page data, store the currently generated temporary parity data for the j-th page data in the selected second sub-region in way of overwriting; and after the storing of the j-th page data is complete, update the state of the selected second sub-region to an encoding complete state.

11. The memory system of claim 1, wherein, the controller is further configured to: obtain configuration information of the memory; determine first buffer configuration information based on the configuration information of the memory, and send the first buffer configuration information to the host through the second interface; and the host is configured to: receive the first buffer configuration information through the first interface, configure a first buffer based on the first buffer configuration information, wherein the first buffer is to store currently generated temporary parity data sent from the controller and received through the first interface.

12. The memory system of claim 1, wherein the controller is further configured to:

obtain configuration information of the memory;

determine second buffer configuration information based on the configuration information of the memory; and configure a second buffer based on the second buffer configuration information, wherein the second buffer is to store the previously backed-up temporary parity data received by the controller through the second interface from the host and the currently generated temporary parity data generated by the controller.

13. A controller, coupled to a host and a memory and comprising an interface, the memory comprising a plurality of memory planes, each memory plane of the plurality of memory planes comprising a plurality of word lines numbered according to the same rule, and each word line of the plurality of word lines is coupled to a plurality of memory strings; wherein the controller is configured to: obtain target write data, the target write data comprising write data corresponding to a plurality of selected word lines respectively, and the plurality of selected word lines comprise word lines with target word line numbers in the plurality of memory planes; and in a process of storing the target write data in the memory strings coupled to the plurality of selected word lines respectively, send currently generated temporary parity data to the host through the interface, and receive previously backed-up temporary parity data from the host through the interface, to determine target parity data for the target write data, wherein the currently generated temporary parity data is parity data currently generated by the controller in the process of determining the target parity data, and the previously backed-up temporary parity data is temporary parity data previously generated by the controller in the process of determining the target parity data and previously stored at the host.

14. The controller of claim 13, wherein the plurality of selected word lines comprises N groups of selected word lines, each group of selected word lines comprising n selected word lines, where n is greater than or equal to 1, and N is greater than 1;

the controller is configured to:

store target write data corresponding to each group of selected word lines in the N groups of selected word lines sequentially;

after the storing of the target write data corresponding to an i-th group of selected word lines is complete, i is greater than or equal to 1, send the currently generated temporary parity data for the target write data corresponding to the i-th group of selected word lines through the interface; and determine the currently generated temporary parity data for the target write data corresponding to an N-th group of selected word lines as the target parity data.

15. The controller of claim 14, wherein the i is greater than 1;

the controller is configured to: obtain the previously backed-up temporary parity data for the target write data corresponding to an i−1th group of selected word lines backed up on the host through the interface, and determine the currently generated temporary parity data for the target write data corresponding to the i-th group of selected word lines based on the obtained previously backed-up temporary parity data.

16. The controller of claim 14, wherein the memory comprises at least one memory die, each memory die of the at least one memory die comprising the plurality of memory planes;

the target write data corresponding to each group of selected word lines comprises a plurality of page data numbered according to the same rule; and the controller further comprises a buffer, the buffer comprises at least one region, each region comprises a plurality of sub-regions, and a total number of sub-regions in each region is less than the total number of page data corresponding to one group of selected word lines, and each sub-region is to store currently generated temporary parity data for one page data.

17. The controller of claim 16, further configured to:

obtain configuration information of the memory;

determine buffer configuration information based on the configuration information of the memory;

configure the buffer based on the buffer configuration information; and wherein, the buffer is to store the previously backed-up temporary parity data received by the controller through the interface from the host and the currently generated temporary parity data generated by the controller.

18. The controller of claim 13, wherein, the controller is further configured to:

obtain configuration information of the memory; and determine first buffer configuration information based on the configuration information of the memory; and send the first buffer configuration information to the host through the interface.

19. An operation method of memory system, wherein the memory system comprises a host, a controller and a memory, the host comprises a first interface, the controller comprises a second interface, the memory comprises a plurality of memory planes, each memory plane of the plurality of memory planes comprises a plurality of word lines numbered according to the same rule, and each word line of the plurality of word lines being coupled to a plurality of memory strings; the method comprising: obtaining, by the controller, target write data, the target write data comprising write data corresponding to a plurality of selected word lines respectively, the plurality of selected word lines comprising word lines with target word line numbers in the plurality of memory planes, and a target memory die being one of the plurality of memory dies; and in a process of storing the target write data to the memory strings coupled to the plurality of selected word lines respectively, sending, by the controller, currently generated temporary parity data to the host through the second interface and the first interface, and receiving, by the controller, previously backed-up temporary parity data from the host through the first interface and the second interface, to determine target parity data for the target write data, wherein the currently generated temporary parity data is parity data currently generated by the controller in the process of determining the target parity data, and the previously backed-up temporary parity data is temporary parity data previously generated by the controller in the process of determining the target parity data and previously stored at the host.

20. The operation method of claim 19, wherein the plurality of selected word lines comprises N groups of selected word lines, each group of selected word lines comprising n selected word lines, n is greater than or equal to 1, and N is greater than 1, the operation method further comprising:

storing, by the controller, target write data corresponding to each group of selected word lines in the N groups of selected word lines sequentially;

after storing of the target write data corresponding to an i-th group of selected word lines is complete, i is greater than or equal to 1, sending, by the controller, the currently generated temporary parity data for the target write data corresponding to the i-th group of selected word lines through the second interface;

receiving, by the host, the currently generated temporary parity data for the target write data corresponding to the i-th group of selected word lines through the first interface, and store the currently generated temporary parity data for the target write data corresponding to the i-th group of selected word lines; and determining, by the controller, the currently generated temporary parity data for the target write data corresponding to an N-th group of selected word lines as the target parity data.

* * * * *